US012584411B2

(12) United States Patent
van den Bosch et al.

(10) Patent No.: US 12,584,411 B2
(45) Date of Patent: Mar. 24, 2026

(54) MASKING SYSTEM

(71) Applicant: Chromalloy Gas Turbine LLC, Palm Beach Gardens, FL (US)

(72) Inventors: Martinus Adam Petrus van den Bosch, Tilburg (NL); Wilco Bongers, Tilburg (NL); Antonius Mutsaers, Tilburg (NL)

(73) Assignee: Chromalloy Gas Turbine LLC, Palm Beach Gardens, FL (US)

( * ) Notice: Subject to any disclaimer, the term of this patent is extended or adjusted under 35 U.S.C. 154(b) by 0 days.

(21) Appl. No.: 18/805,478

(22) Filed: Aug. 14, 2024

(65) Prior Publication Data

US 2026/0049555 A1 Feb. 19, 2026

(51) Int. Cl.
*F01D 5/14* (2006.01)
*F01D 25/24* (2006.01)

(52) U.S. Cl.
CPC ........... *F01D 5/147* (2013.01); *F01D 25/246* (2013.01); *F05D 2240/80* (2013.01)

(58) Field of Classification Search
CPC ......... C23C 10/04; C23C 14/042; C23C 4/01; C23C 14/50; C23C 16/045; C23C 8/04; C23C 28/00; C23C 10/02; C23C 10/60; C23C 18/06; F01D 5/288; F01D 5/005; F01D 5/18; F01D 5/147; F01D 25/246; F01D 25/285; F01D 25/007; F01D 5/286; F01D 9/065; F05D 2230/90; F05D 2300/611; F05D 2220/32; F05D 2230/20; F05D 2240/80; B05B 12/20; B05B 12/26; B05B 13/0292
See application file for complete search history.

(56) References Cited

U.S. PATENT DOCUMENTS

| | | | | | |
|---|---|---|---|---|---|
| 5,792,267 | A * | 8/1998 | Marszal | C23C 4/01 | 118/721 |
| 6,296,705 | B1 * | 10/2001 | Ireland | B05B 12/20 | 118/721 |
| 6,706,323 | B2 * | 3/2004 | Wheat | C23C 10/04 | 427/248.1 |
| 7,066,799 | B2 * | 6/2006 | Oussaada | C23C 4/01 | 451/439 |
| 8,967,078 | B2 * | 3/2015 | Soucy | B24B 31/00 | 29/451 |

* cited by examiner

*Primary Examiner* — Eric J Zamora Alvarez
(74) *Attorney, Agent, or Firm* — AVEK IP, LLC

(57) ABSTRACT

A masking system for selectively masking a component is provided. The component has a projection. The masking system includes a first piece having a recessed area. The recessed area is configured to house the projection. The masking system has a second piece securable to the first piece. A first portion of the component is masked and a second portion of the component is exposed when the projection is housed within the recessed area and the first piece is secured to the second piece.

19 Claims, 31 Drawing Sheets

MASKING SYSTEM

CROSS REFERENCE TO RELATED APPLICATIONS

None.

FIELD OF THE DISCLOSURE

The disclosure relates generally to the field of masking systems. More specifically, the disclosure relates to multi-component masking systems configured to selectively mask components for coating and other processes.

SUMMARY

The following presents a summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In an aspect, a masking system for selectively masking a component is provided. The component has a projection. The masking system includes a first piece having a recessed area. The recessed area is configured to house the projection. The masking system has a second piece securable to the first piece. A first portion of the component is masked and a second portion of the component is exposed when the projection is housed within the recessed area and the first piece is secured to the second piece.

In an aspect, according to any one of the preceding aspects, the first piece includes a first opening and the second piece includes a second opening that aligns with the first opening when the first piece is secured to the second piece.

In an aspect, according to any one of the preceding aspects, the first piece includes a receiving area for receiving the first portion.

In an aspect, according to any one of the preceding aspects, a shape of the receiving area corresponds to a shape of the first portion.

In an aspect, according to any one of the preceding aspects, each of the first piece and the second piece has a unitary construction.

In an aspect, according to any one of the preceding aspects, at least one of the first piece and the second piece is additively manufactured.

In an aspect, according to any one of the preceding aspects, the component is gas turbine engine component.

In an aspect, according to any one of the preceding aspects, the component is a blade.

In an aspect, according to any one of the preceding aspects, the projection extends from a root of the blade.

In an aspect, according to any one of the preceding aspects, the first portion includes the root of the blade.

In an aspect of the disclosure, a masking system for selectively masking a blade is provided. The blade has a root and a projection extending from the root. The masking system includes a first piece having a recessed area. The recessed area is configured to house the projection. The masking system includes a second piece securable to the first piece. When the projection is housed within the recessed area and the first piece is secured to the second piece, the root is encapsulated by the masking system.

In an aspect, according to any one of the preceding aspects, the first piece has a receiving area that supports a bottom surface of the root when the root is encapsulated by the masking system.

In an aspect, according to any one of the preceding aspects, the masking system includes a fastener that passes through a first opening in the first piece and a second opening in the second piece.

In an aspect, according to any one of the preceding aspects, an airfoil and a top edge of a platform of the blade are exposed when the root is encapsulated by the masking system and the first piece is secured to the second piece.

In an aspect, according to any one of the preceding aspects, the first piece includes a first portion and a second portion. The first portion extending perpendicularly to the second portion.

In an aspect, according to any one of the preceding aspects, each of the first piece and the second piece has a unitary construction.

In an aspect, according to any one of the preceding aspects, the masking system is reusable to selectively mask a second blade.

In an aspect, a method of selectively masking a component is provided. The component has a projection. The method includes situating the projection in a recessed area of a first piece and securing a second piece to the first piece. When the projection is situated in the recessed area and the first piece is secured to the second piece, at least a first part of the component is masked and at least a second part of the component is exposed.

In an aspect, according to any one of the preceding aspects, the method includes passing a fastener through a first opening in the first piece and a second opening in the second piece.

In an aspect, according to any one of the preceding aspects, the method includes sliding a portion of the component in a receiving area of the first piece.

BRIEF DESCRIPTION OF THE DRAWINGS

Illustrative embodiments of the present disclosure are described in detail below with reference to the attached drawing figures and wherein.

DETAILED DESCRIPTION

A gas turbine engine typically includes a multi-stage compressor coupled to a multi-stage turbine via an axial shaft. The multi-stage compressor may include a low-pressure compressor and a high-pressure compressor, and the multi-stage turbine may include a low-pressure turbine and a high-pressure turbine. Air enters the gas turbine engine through the low-pressure compressor where its temperature and pressure are increased as it passes through subsequent stages of the compressor. The compressed air is then directed to one or more combustors where it is mixed with a fuel source to create a combustible mixture. This mixture is ignited in the combustors to create a flow of hot combustion gases. These gases are directed into the turbine causing the turbine to rotate, thereby driving the compressor. The output of the gas turbine engine can be mechanical thrust via exhaust from the turbine or shaft power from the rotation of an axial shaft, where the axial shaft can drive a generator to produce electricity.

The compressor and turbine each typically include a plurality of rotating blades and stationary vanes having an airfoil extending into the flow of compressed air or flow of hot combustion gases. Each blade or vane has a particular set of design criteria which must be met to provide the necessary work to the flow passing through the compressor and the turbine. However, due to the severe nature of the operating environment, especially in the turbine, it is often necessary to cool these blades and vanes. The blades and vanes often utilize complex internal cooling passageways in order to maximize the efficiency of cooling fluid passing therethrough.

Gas turbine engines also typically include a fan that may be disposed at the front of the engine. The fan may include a disc to which a plurality of fan blades is coupled. The fan may rotate to increase the amount of air moving through the engine, and therefore increase the engine's thrust. The size of the fan blades may be greater than the size of the compressor blades and the turbine blades.

Figure 1:
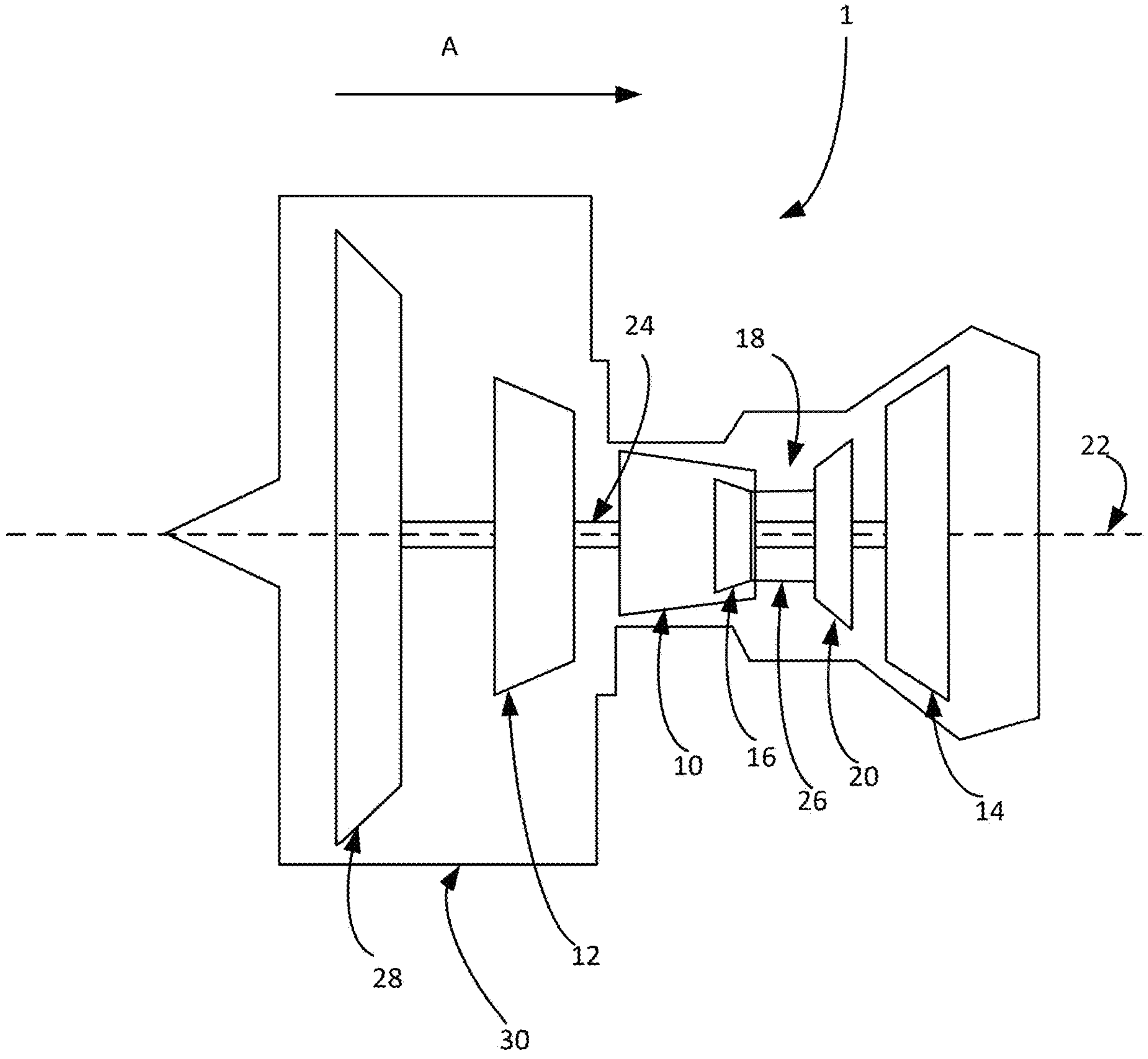
FIG. 1 is a schematic view of a gas turbine engine, according to some aspects of the disclosure.

FIG. 1 schematically illustrates a gas turbine engine 1. The gas turbine engine 1 typically includes a generator 10, a low-pressure compressor 12, a low-pressure turbine 14, a high-pressure compressor 16, a combustion chamber 18, and a high-pressure turbine 20. Gases may flow into the gas turbine engine 1 in direction A, which may be parallel to a longitudinal axis 22 of the gas turbine engine 1. The low-pressure compressor 12 and low-pressure turbine 14 may be operably connected by low-pressure shaft 24 centered on longitudinal axis 22. Similarly, the high-pressure compressor 16 and the high-pressure turbine 20 may be operably connected via a high-pressure shaft 26 centered on longitudinal axis 22. The high-pressure shaft 26 may be arranged around the low-pressure shaft 24. The gas turbine engine 1 may also include a fan 28 that may be encased in a fan casing 30. The fan 28 may be disposed upstream the low-pressure compressor 12, and may include a plurality of fan blades 40 that rotate about longitudinal axis 22. Fan 28, in some examples, may be movably coupled to low-pressure shaft 24 and driven by the low-pressure turbine 14.

Figure 2:
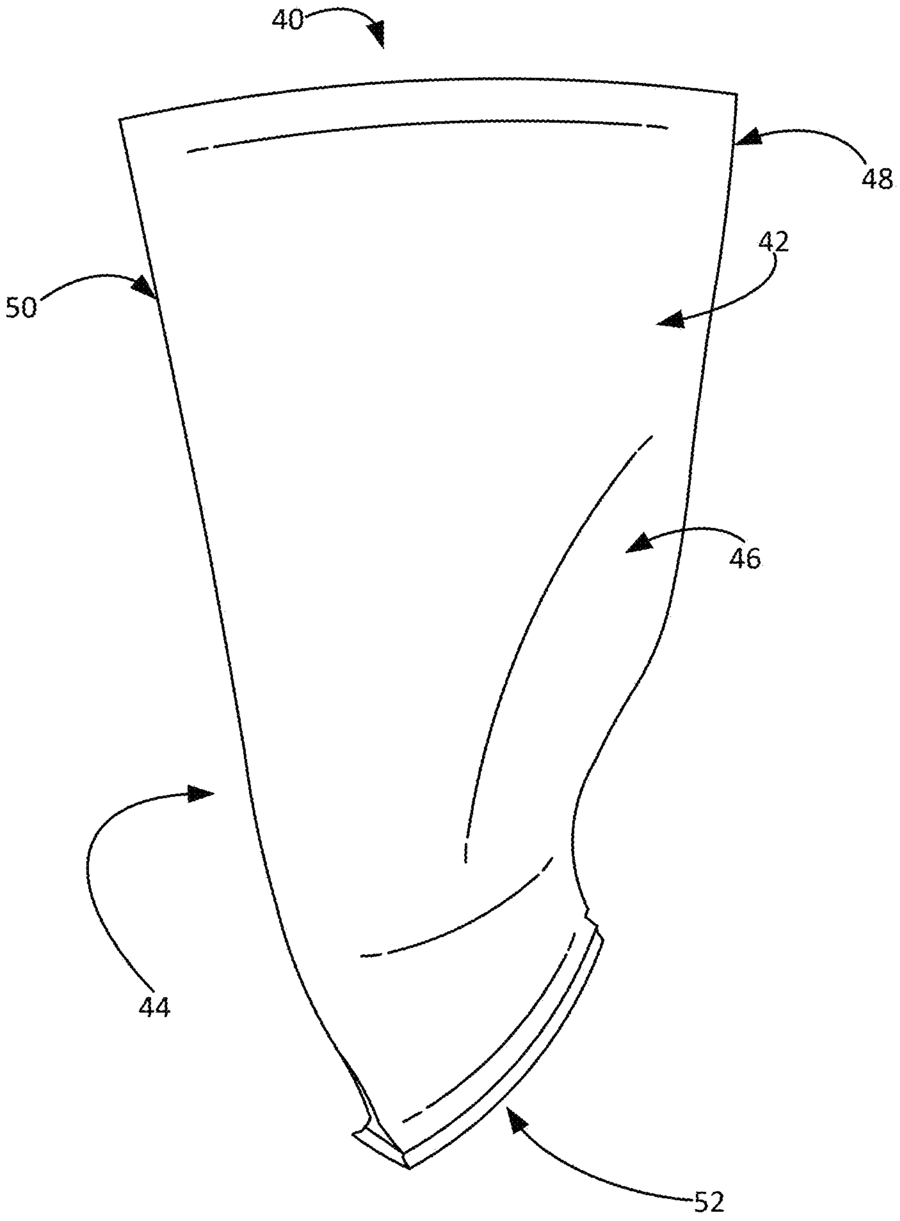
FIG. 2 is a perspective view of a fan blade, according to some aspects of the disclosure.

FIG. 2 shows a fan blade 40. Fan blade 40 may be one of a plurality of fan blades of fan 28 of FIG. 1, or one of a plurality of fan blades of another gas turbine engine fan. The fan blade 40 includes an airfoil 42, which has a pressure surface 44 (not clearly visible in FIG. 2) and a suction surface 46. The pressure surface 44 and suction surface 46 each extend from leading edge 48 to trailing edge 50 of airfoil 42. The fan blade 40 may, at a lowermost section thereof, include dovetail 52. Dovetail 52 may have a generally firtree shape.

FIGS. 3A-3D show an example compressor blade 60. The compressor blade 60 may be one of a plurality of blades of low-pressure compressor 12, one of a plurality of blades of high-pressure compressor 16, or one of a plurality of blades of another low-pressure or high-pressure compressor (e.g., of another gas turbine engine). The compressor blade 60 may include an airfoil 62, which has a suction surface 64 (see FIG. 3A) and a pressure surface 66 (see FIG. 3B) opposing suction surface 64. Suction surface 64 and pressure surface 66 may each extend from leading edge 68 to trailing edge 70 of airfoil 62.

Compressor blade 60 may, at a lowermost section thereof, include a root portion or dovetail (hereinafter "root portion 72"). Root portion 72 may have a first side 74 (see FIG. 3A), a second side 76 (see FIG. 3B), a first end 78 (see FIG. 3C), a second end 80 (see FIG. 3D), and a bottom side 82. Each of first side 74, second side 76, first end 78, and second end 80 may extend upwards from bottom side 82.

First side 74 of root portion 72 may extend generally laterally below suction surface 64 of airfoil 62. Second side 76 of root portion 72 may oppose first side 74 and may extend generally laterally below pressure surface 66 of airfoil 62. First end 78 of root portion 72 may be below leading edge 68 and extend generally longitudinally from first side 74 of root portion 72 to second side 76 thereof. Second end 80 of root portion 72 may be below trailing edge 70 and extend generally longitudinally from first side 74 of root portion 72 to second side 76 thereof.

Figure 3A:
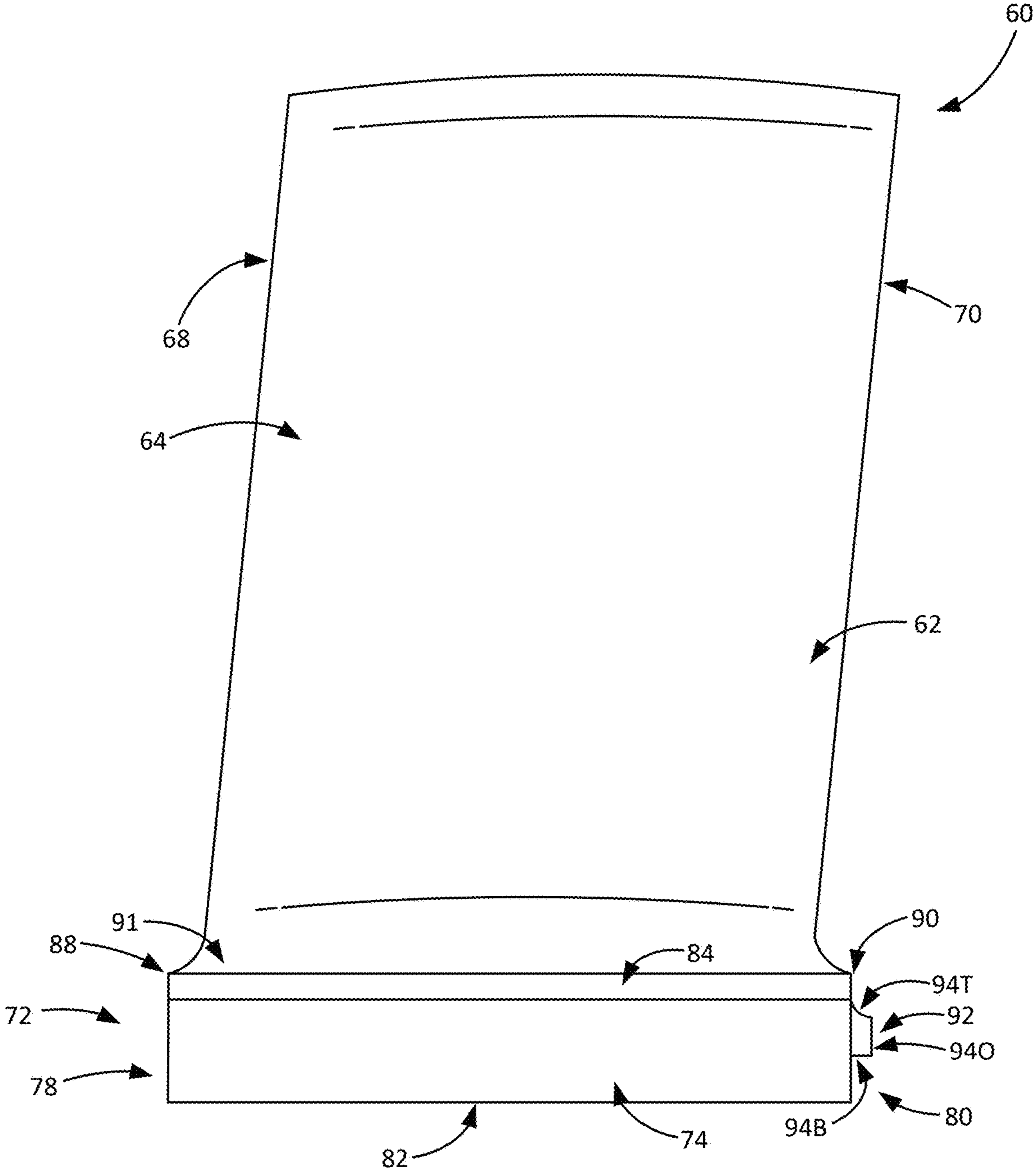
FIG. 3A is a front view of a compressor blade, according to some aspects of the disclosure.
Figure 3B:
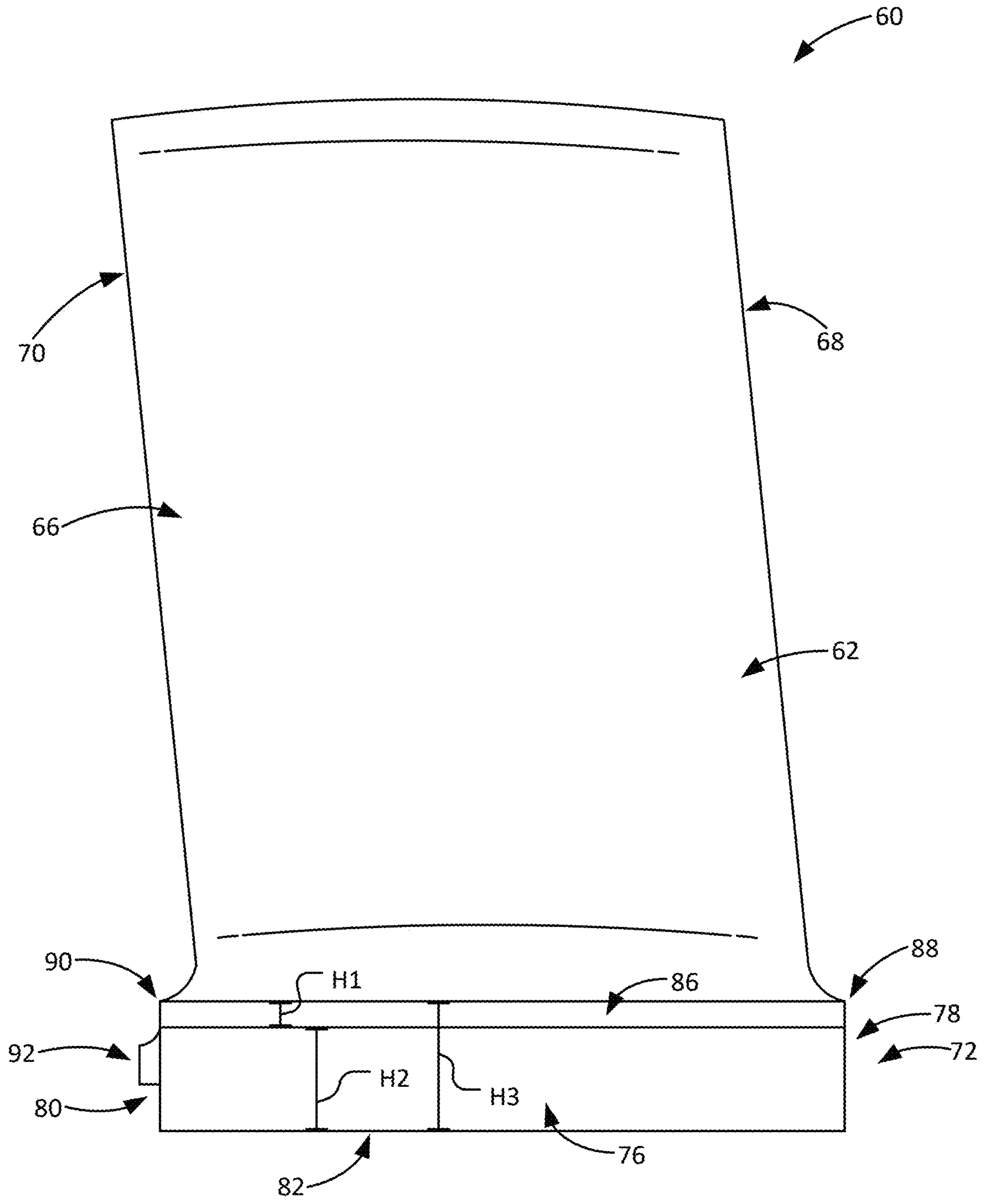
FIG. 3B is a rear view of the compressor blade of FIG. 3A, according to some aspects of the disclosure.
Figure 3C:
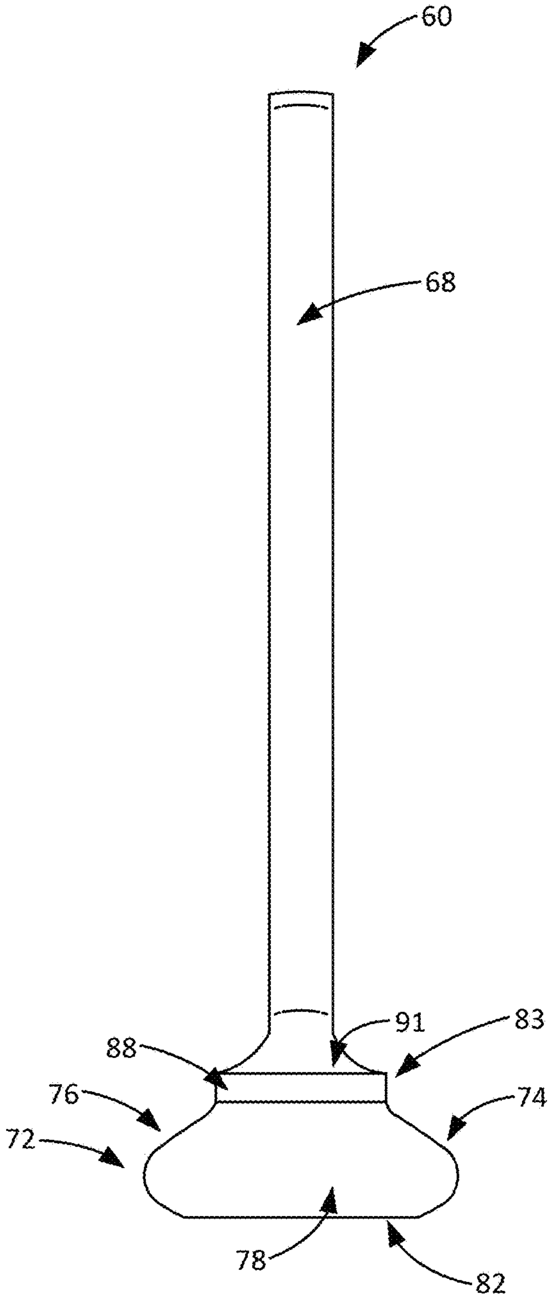
FIG. 3C is an end view of the compressor blade of FIG. 3A, according to some aspects of the disclosure.
Figure 3D:
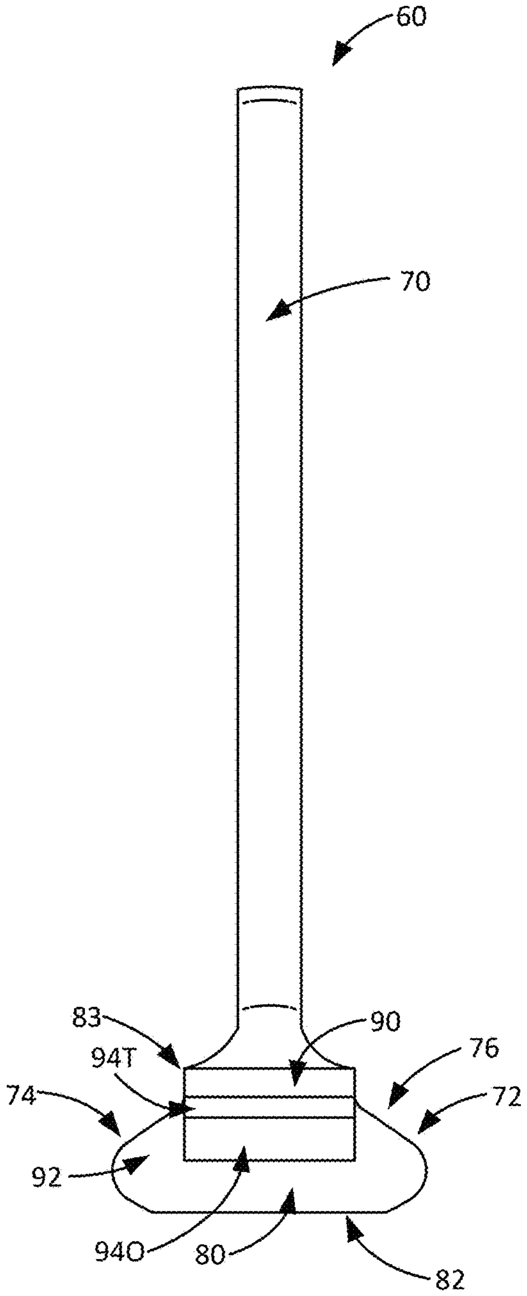
FIG. 3D is an opposing end view of the compressor blade of FIG. 3C, according to some aspects of the disclosure.

In some examples, bottom side 82 may be generally flat, whereas each of first side 74 and second side 76 that extend therefrom may be rounded (see FIGS. 3C and 3D). For instance, each of first end 78 and second end 80 of root portion 72 may have a generally bulbous or double frusto-elliptical shape. In other examples, any one or more of first side 74, second side 76, first end 78, second end 80, and bottom side 82 may be generally flat, rounded, or be formed in other symmetrical or asymmetrical shapes.

A platform 83 (see FIG. 3C) may be disposed between the airfoil 62 and the root portion 72. Airfoil 62 may extend above platform 83, and root portion 72 may extend below platform 83. Platform 83 may have a first side 84 (see FIG. 3A), a second side 86 (see FIG. 3B), a first edge 88 (see FIG. 3C), a second edge 90 (see FIG. 3D), and a top edge 91 (see FIGS. 3A and 5). First side 84 of platform 83 may extend generally laterally above first side 74 of root portion 72. Second side 86 of platform 83 may oppose first side 84 thereof and extend generally laterally above second side 76 of root portion 72. First edge 88 of platform 83 may extend generally longitudinally above first end 78 of root portion 72, and second edge 90 of platform 83 may extend generally longitudinally above second end 80 of root portion 72. Top edge 91 of platform 83 may oppose bottom side 82 of root portion 72. Airfoil 62 may extend from top edge 91.

Figure 5:
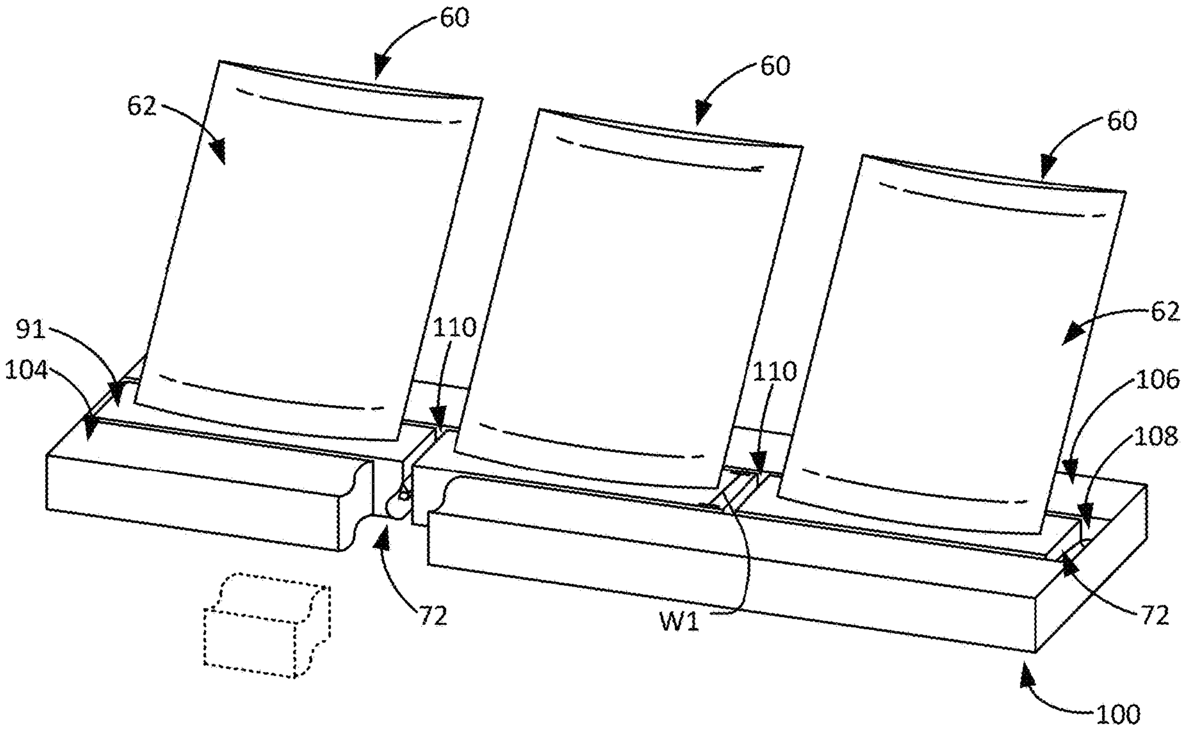
FIG. 5 is a perspective view of the masking device of FIG. 4 with a plurality of compressor blades of FIGS. 3A-3D disposed in an insertion area thereof, according to some aspects of the disclosure.

In some examples, top edge 91 of platform 83 may have a width W1 (see FIG. 5). Platform 83 may have a height H1 (see FIG. 3B), and root portion 72 may have a height H2. Height H1 plus height H2, i.e., the combined height of platform 83 and root portion 72, may equal height H3.

In some examples of the embodiments, a protrusion may protrude from one or more of first side 74, second side 76, first end 78, and second end 80 of root portion 72 (and/or elsewhere from the compressor blade 60). For instance, projection 92 may protrude from second end 80 of root portion 72 away from first end 78 thereof. In some examples, and as illustrated in FIG. 3D, projection 92 may be downwardly adjacent second edge 90 of platform 83. In other examples, projection 92 may extend from platform 83 itself or from another portion of compressor blade 60.

Projection 92 may be spherical, cylindrical, pyramidal, or take on other symmetrical or asymmetrical shapes. In the illustrated example, projection 92 is asymmetrical and has a top surface 94T (see FIG. 3A), a bottom surface 94B, and an outermost surface 940 (see FIGS. 3A and 3D). The outermost surface 940 may extend between the top surface 94T and bottom surface 94B. In some examples, top surface 94T may be curved.

First end 78 of root portion 72 and first edge 88 of platform 83 may, in some examples, be planar. Similarly, in some examples, second end 80 of root portion 72 (ignoring the projection 92) and second edge 90 of platform 83 may be planar. In some examples, first end 78 and/or second end 80 may extend upwards parallel to the vertical plane. In other examples, first end 78 and/or second end 80 may extend upwards at an angle.

The hot gas path within a gas turbine engine, such as gas turbine engine 1, may be both thermally and chemically hostile. Improvements have been made to the high-temperature capabilities of gas turbine components via development of iron, nickel and cobalt-base superalloys. The capability of gas turbine parts to withstand the thermally and chemically hostile environment of the hot gas path within gas turbine engine 1 may also be improved via the use of oxidation-resistant environmental coatings capable of protecting these parts from oxidation and corrosion. As one example, aluminum-containing coatings, such as diffusion aluminide coatings, may be used as an environmental coating on gas turbine components. During high temperature exposure in air, aluminum-containing coatings may form a protective aluminum oxide (alumina) scale or layer that inhibits corrosion and oxidation of the coating and the underlying substrate. As another example, thermal barrier coatings, such as ceramic coatings, may be applied to gas turbine components to thermally insulate these components within the hot gas path.

It may be desirable to apply one or more coatings, e.g., environmental barrier coatings, thermal barrier coatings, et cetera, to a gas turbine component selectively, e.g., to apply coating only to those portions of the gas turbine component that are exposed to the extremely high temperatures associated with the hot gas path of the gas turbine engine 1. For example, it may be desirable to apply a coating to the compressor blade 60 such that only the airfoil 62 and top edge 91 of platform 83 are coated; that is, it may be desirable to ensure that the coating does not impact the root portion 72 and does not impact each of first side 84, second side 86, first edge 88, and second edge 90 of platform 83. If the environmental barrier coating, thermal barrier coating, and/or other coating is inadvertently disposed, e.g., on the root portion 72, and/or on any of first side 84, second side 86, first edge 88, and second edge 90 of platform 83, the coating may add unnecessary weight to the compressor blade 60 and may adversely interfere with the coupling of the compressor blade 60 to the hub. Therefore, any coating that is inadvertently disposed on these surfaces may need to be removed, e.g., laboriously using a sanding, grit blasting, or other process. In some cases, the compressor blade 60 may need to be scrapped due to the inadvertent application of the coating to the root portion 72 and/or the first side 84, second side 86, first edge 88, or second edge 90 of platform 83.

Figure 4:
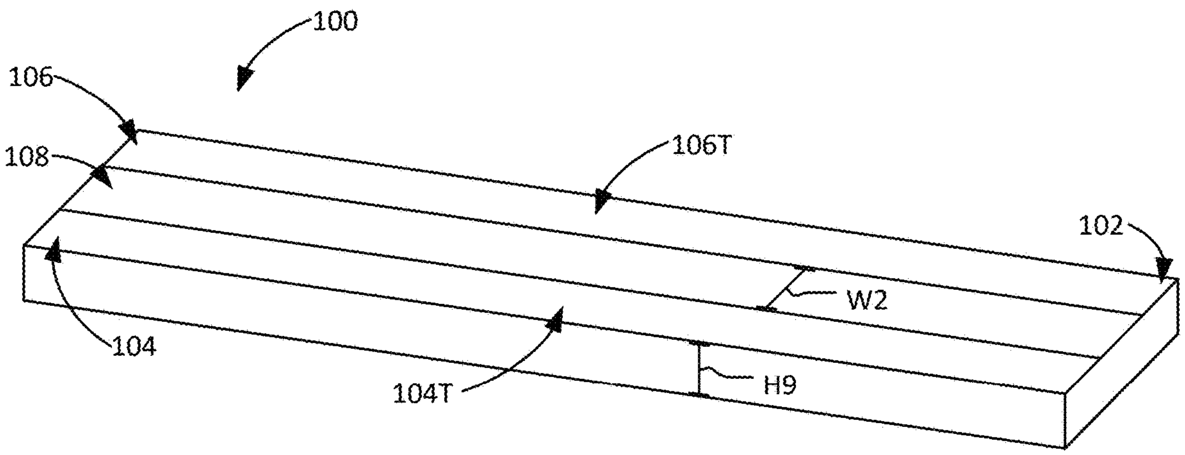
FIG. 4 is a perspective view of a masking device, according to some aspects of the disclosure.

FIG. 4 shows a masking device 100 for selectively masking a component to be coated. For example, masking device 100 may be employed to selectively mask one or more surfaces of a component of a gas turbine engine, such as one or more surfaces of a compressor blade, a fan blade, a turbine blade, et cetera. For instance, the masking device 100 may be used to coat the airfoil of the blade without impacting the root thereof.

In some examples of the embodiments, masking device 100 includes a housing 102 for supportively retaining a plurality of blades that are to be selectively coated. The housing 102 may include a first member 104 and a second member 106 that each extend laterally along the length of the housing 102. First member 104 may have a top side 104T and second member may have a top side 106T. Top side 104T of first member 104 and top side 106T of second member 106 may be spaced apart from each other and define a cavity or insertion area (hereinafter "insertion area 108") therebetween. Insertion area 108 may have a width W2 (see FIG. 4). Housing 102 may have a height H9, which in this example, may also be the height of the insertion area 108. Insertion area 108 may be configured to insertably receive one or more portions of the component to be selectively coated. For example, where the component is a blade, the root of the blade may be inserted into the insertion area 108 such that the airfoil of the blade extends above the housing 102. The blade may then be selectively coated, e.g., with diffusion aluminide coating and/or another coating, while the root of the blade is housed within the insertion area 108. As one example, masking device 100, with the root of the blade housed within insertion area 108, may be coated with diffusion aluminide coating. The masking device 100 may mask the root of the blade and preclude the diffusion aluminide or other coating from being disposed on the root.

It may be more cost-effective and efficient to use the masking device 100 to selectively apply the diffusion aluminide or other coating to a plurality of components, e.g., a plurality of blades, at the same time. The insertion area 108 may therefore be configured to insertably receive root portions of a plurality of blades. The masking device 100 may allow for the airfoils of these blades to be coated while the root portions of the blades are masked and unaffected by the coating.

FIG. 5 shows root portions 72 of three compressor blades 60 insertably received within the insertion area 108 of the masking device 100, so that each of the three compressor blades 60 may be selectively coated, e.g., with diffusion aluminide coating and/or another coating, at the same time. In the illustrated example, it is desirable to selectively coat each compressor blade 60 such that only airfoil 62 and top edge 91 of platform 83 of each compressor blade 60 is coated (e.g., because the airfoil 62 and top edge 91 of platform 83 of each compressor blade 60 is in the hot gas path of the gas turbine engine 1). That is, it may be desirable to mask each of the root portion 72, and the first side 84, second side 86, first edge 88, and second edge 90 of platform 83 of each compressor blade 60, so as to ensure that these portions of the compressor blades 60 are not coated with, or are only minimally impacted by, the coating.

Figure 6:
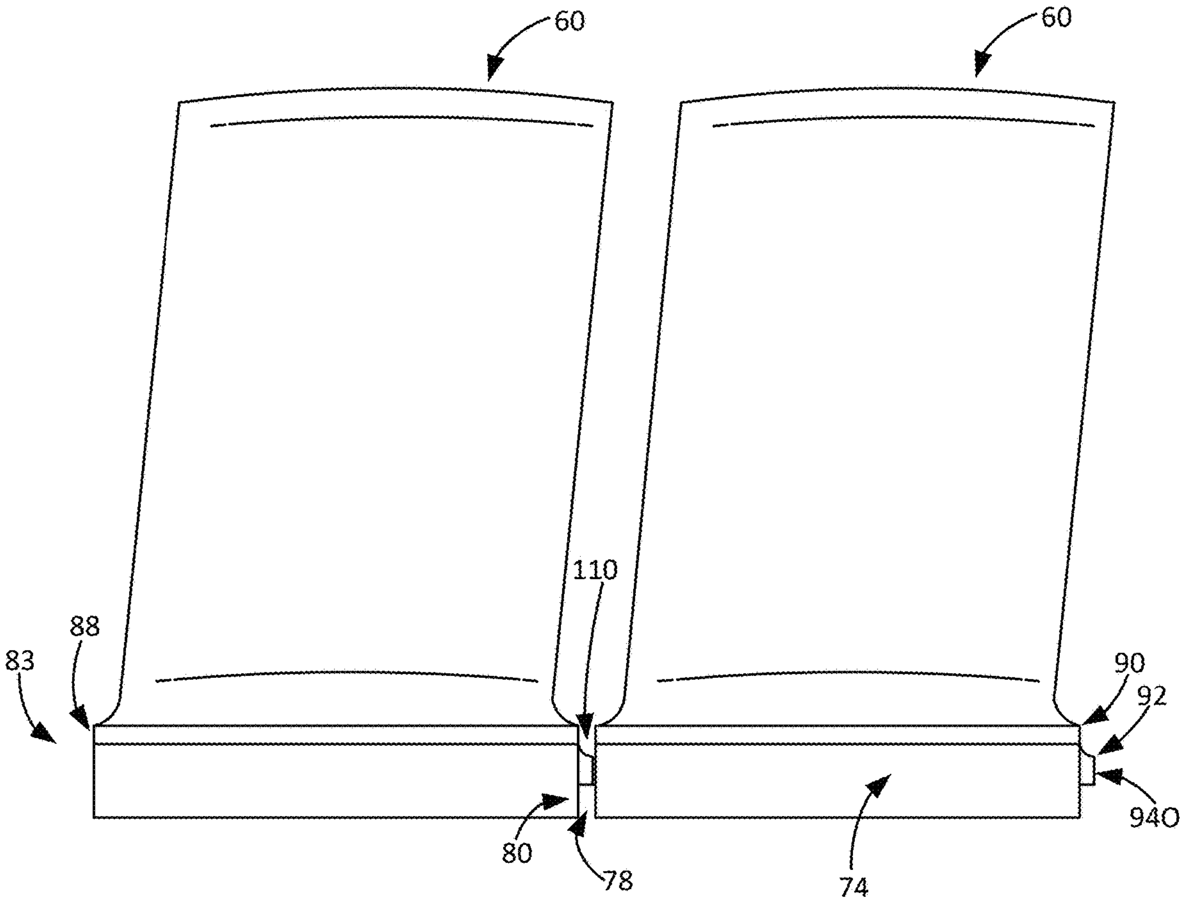
FIG. 6 shows two compressor blades of FIGS. 3A-3D in an end-to-end configuration.

As shown in FIG. 5, root portions 72 of the three compressor blades 60 are disposed side by side in the insertion area 108 of masking device 100. When the compressor blades 60 are so arranged, the second end 80 (see FIG. 3A) of root portion 72 of one compressor blade 60 faces the first end 78 (see FIG. 3A) of root portion 72 of the adjacent compressor blade 60. More particularly, as shown more clearly in FIG. 6, when the compressor blades 60 are arranged side by side, e.g., in insertion area 108 (see FIG. 5), projection 92 extending from second end 80 of root portion 72, and more particularly, outermost surface 940 (see FIG. 3A) of projection 92, contacts and abuts first end 78 of root portion 72 of the adjacent compressor blade 60. The projection 92 precludes platforms 83 of the adjacent compressor blades 60 from contacting each other, and causes a gap 110 (see FIG. 5) to be formed between first edge 88 (see also FIG. 3C) of platform 83 one compressor blade 60 and second edge 90 (see also FIG. 3D) of platform 83 of the adjacent compressor blade 60. Gap 110 may adversely interfere with the selective coating of compressor blades 60. That is, if the three compressor blades 60 positioned in the masking device 100 as shown in FIG. 5 are coated, at least some coating (e.g., diffusion aluminide coating and/or another coating) may pass through the gap 110 and result in undesirable application of the coating to root portion 72 and/or one or more of first side 84, second side 86, first edge 88, and second edge 90 of platform 83 of compressor blades 60. The coating on root portion 72 and/or one or more of first side 84, second side 86, first edge 88, and second edge 90 of platform 83 of each compressor blades 60 then must be laboriously removed, which may be unsuitable. In some cases, one or more of the compressor blades 60 must be scrapped. It may be desirable to ensure that application of coating on the root portion 72 and/or one or more of first side 84, second side 86, first edge 88, and second edge 90 of platform 83 of each compressor blade 60 is precluded or at least minimized.

Figure 7:
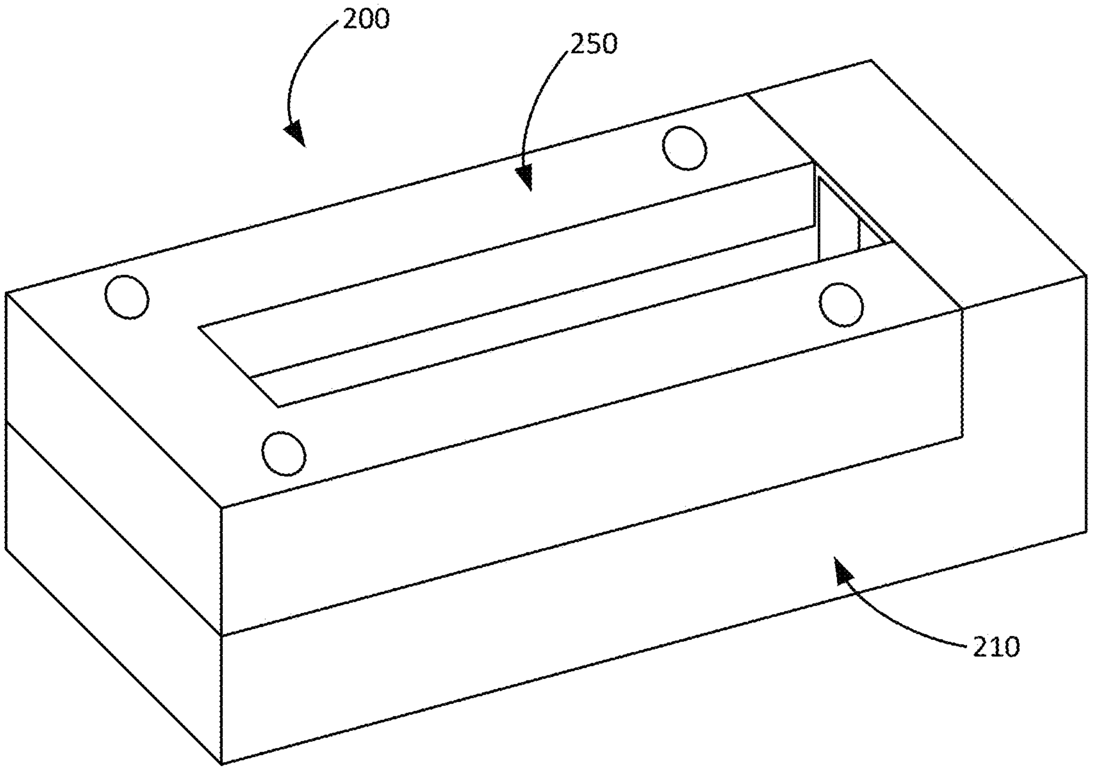
FIG. 7 is a perspective view of a masking system, according to some aspects of the disclosure.

FIG. 7 shows a masking system 200, according to an aspect of the disclosure. Masking system 200 may be configured to retain and selectively mask a component, such as compressor blade 60 or another component. In the illustrated example, masking system 200 may be configured to retain and selectively mask compressor blade 60 during a coating process such that only airfoil 62 and top edge 91 of platform 83 of compressor blade 60 is coated. Only airfoil 62 and top edge 91 of platform 83 may need be coated since only airfoil 62 and top edge 91 of platform 83 of each compressor blade 60 may be in the hot gas path of gas turbine engine 1. That is, masking system 200 may mask root portion 72, and each of first side 84, second side 86, first edge 88, and second edge 90 of platform 83 of compressor blade 60, so as to ensure that these portions of compressor blade 60 are not coated with, or are only minimally impacted by, the coating. The coating may be an environmental barrier coating, a thermal barrier coating, or another coating.

Figure 8A:
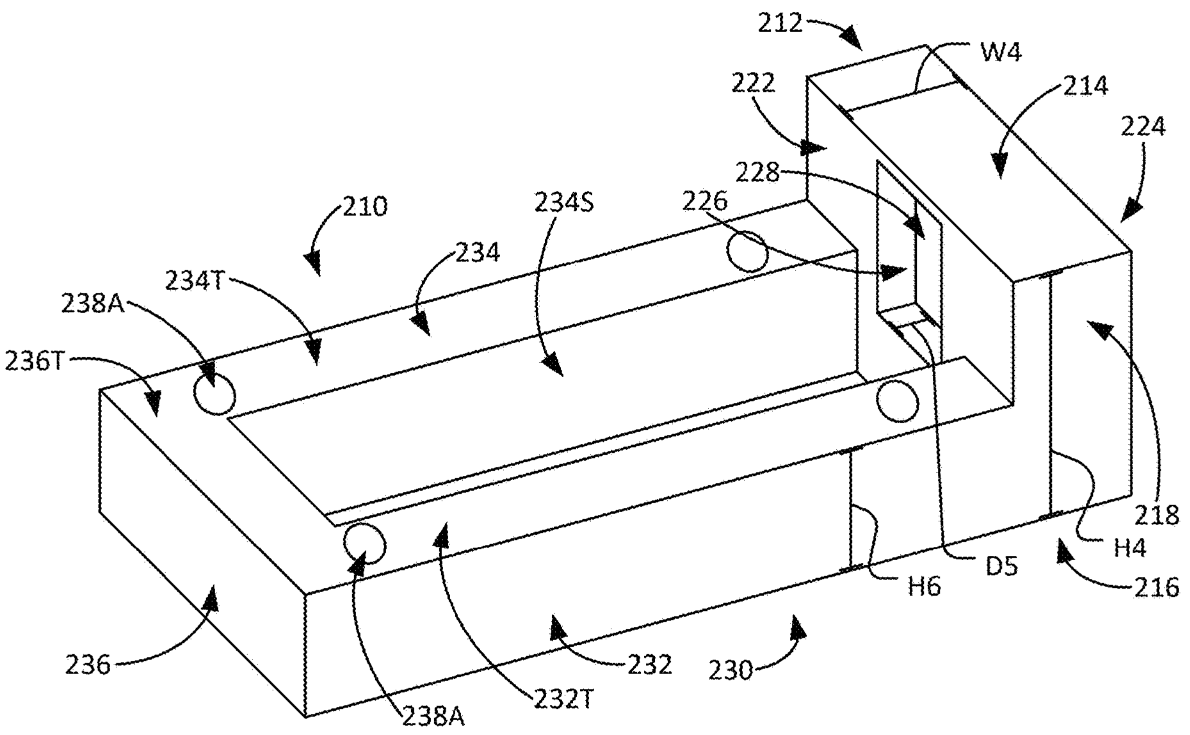
FIGS. 8A-8B are perspective views of a first piece of the masking system of FIG. 7, according to some aspects of the disclosure.
Figure 8B:
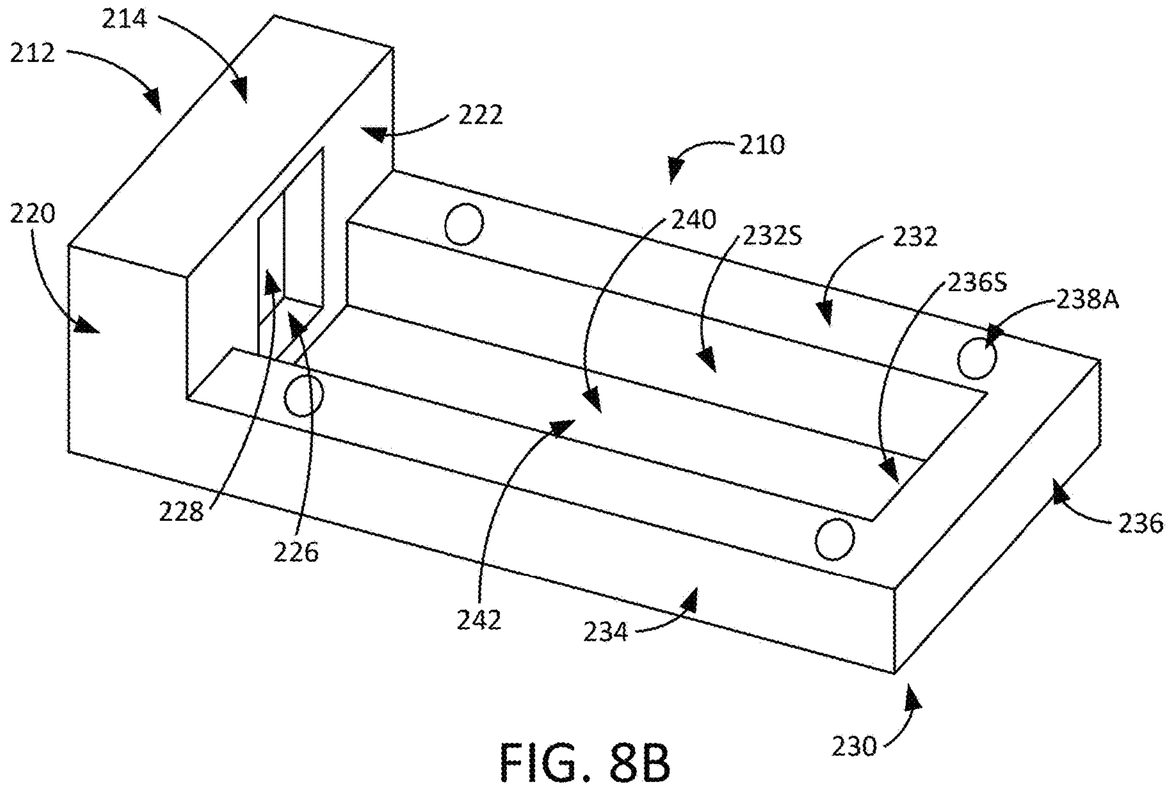

Masking system 200 may be a multi-component system. In some examples of the embodiments, masking system 200 may include a first piece 210 (see FIGS. 8A-8B) and a second piece 250 (see FIGS. 9A-9B). First piece 210 and second piece 250 may be securable to each other or may otherwise be associated with each other. In some examples, compressor blade 60, e.g., root portion 72 thereof, may be insertably received by first piece 210. First piece 210 may partially or fully mask one or more of root portion 72, and first side 84, second side 86, first edge 88, and second edge 90 of platform 83 of compressor blade 60. Second piece 250 may then be secured to first piece 210 while compressor blade 60 is retained within first piece 210. Second piece 250 may cooperate with first piece 210 to selectively mask compressor blade 60 such that each of root portion 72, and first side 84, second side 86, first edge 88, and second edge 90 of platform 83 of compressor blade 60 is masked generally in its entirety. Compressor blade 60, while it is retained within masking system 200, may then be coated. Masking system 200 may preclude or at least minimize application of coating (e.g., aluminide diffusion coating or another coating) to the root portion 72 and/or one or more of first side 84, second side 86, first edge 88, and second edge 90 of platform 83 of compressor blade 60.

In some examples of the embodiments, first piece 210 (see FIGS. 8A-8B) of masking system 200 may include a first portion 212 and a second portion 230. First piece 210 may have a unitary construction (i.e., first portion 212 and second portion 230 may, in some examples, have a unitary or one-piece construction).

First portion 212 may generally be formed in the shape of a rectangular prism. In other examples, first piece 210 may be pyramidal, spherical, or be formed in other symmetrical or asymmetrical shapes. In some examples, first portion 212 may have a top wall 214, a bottom wall 216, a first side wall 218, a second side wall 220, a front wall 222, and a back wall 224 (bottom wall 216 and back wall 224 are not clearly visible in FIGS. 8A-8B). Top wall 214 may oppose bottom wall 216, first side wall 218 may oppose second side wall 220, and front wall 222 may oppose back wall 224. First side wall 218 and second side wall 220 may have the same height H4, and top wall 214 and bottom wall 216 may have the same width W4.

In some examples, front wall 222 may include a recessed area 226. Recessed area 226 may have a depth D5. Width W4 of top wall 214 may be greater than depth D5 of recessed area 226. That is, recessed area 226 may not extend all the way through first portion 212. For instance, recessed area 226 may have a rear wall 228 that extends generally parallel to front wall 222 and is spaced apart therefrom. Rear wall 228 may preclude access to recessed area 226 from back wall 224 of first portion 212. In some examples, recessed area 226 may be configured (e.g., sized) to receive a portion of a component. For example, recessed area 226 may be configured to receive projection 92 of compressor blade 60.

Second portion 230 may include a first member 232, a second member 234, and a third member 236. In some examples, each of first member 232, second member 234, and third member 236 may be generally cuboidal. In other examples, any one or more of first member 232, second member 234, and third member 236 may be spherical, cylindrical, pyramidal, or be formed in other symmetrical or asymmetrical shapes.

First member 232 and second member 234 may be spaced apart from each other. One respective end of each of first member 232 and second member 234 may extend laterally from front wall 222 of first portion 212. Third member 236 may extend longitudinally between first member 232 and second member 234 at the other respective end of each of first member 232 and second member 234. Thus, in some examples, first member 232, second member 234, and third member 236 may collectively form a squared U-shape.

First member 232 may have a height H6. In some examples, second member 234 and third member 236 may have the same height H6. In other examples, one or more of first member 232, second member 234, and third member 236 may have a different height. Height H6 may be less than height H4 of first side wall 218 of first portion 212. That is, first portion 212 may extend above second portion 230.

Each of first member 232, second member 234, and third member 236 may have a respective top surface 232T, 234T, and 236T. In some examples, because each of first member 232, second member 234, and third member 236 have the same height H6, top surfaces 232T, 234T, and 236T may each extend in the same or in generally the same horizontal plane.

In some examples, one or more openings 238A may extend through one or more of top surface 232T, top surface 234T, and top surface 236T. For instance, an opening 238A may extend through top surface 232T of first member 232 proximate first portion 212 and another opening 238A may extend through top surface 232T of first member 232 proximate third member 236. Similarly, an opening 238A may extend through top surface 234T of second member 234 proximate first portion 212 and another opening 238A may extend through top surface 234T of second member 234 proximate third member 236. In some examples, openings 238A may not extend all the way through the respective first member 232, second member 234, or third member 236.

Each of first member 232, second member 234, and third member 236 may have a respective (interior) side surface 232S, 234S, and 236S. Side surface 232S of first member 232 may face side surface 234S of second member 234, and side surface 236S of third member 236 may face front wall 222 of first portion 212. A lower wall 240 may extend continuously between side surface 232S, side surface 234S, side surface 236S, and front wall 222. Lower wall 240 may extend generally parallel to and may be spaced apart from each of top surface 232T of first member 232, top surface 234T of second member 234, and top surface 236T of third member 236.

Front wall 222 of first portion 212, side surface 232S of first member 232, side surface 234S of second member 234, side surface 236S of third member 236, and lower wall 240, may collectively define a receiving area 242. As discussed herein, receiving area 242 may be configured to insertably receive a portion of a component, such as root portion 72 of compressor blade 60.

Figure 9A:
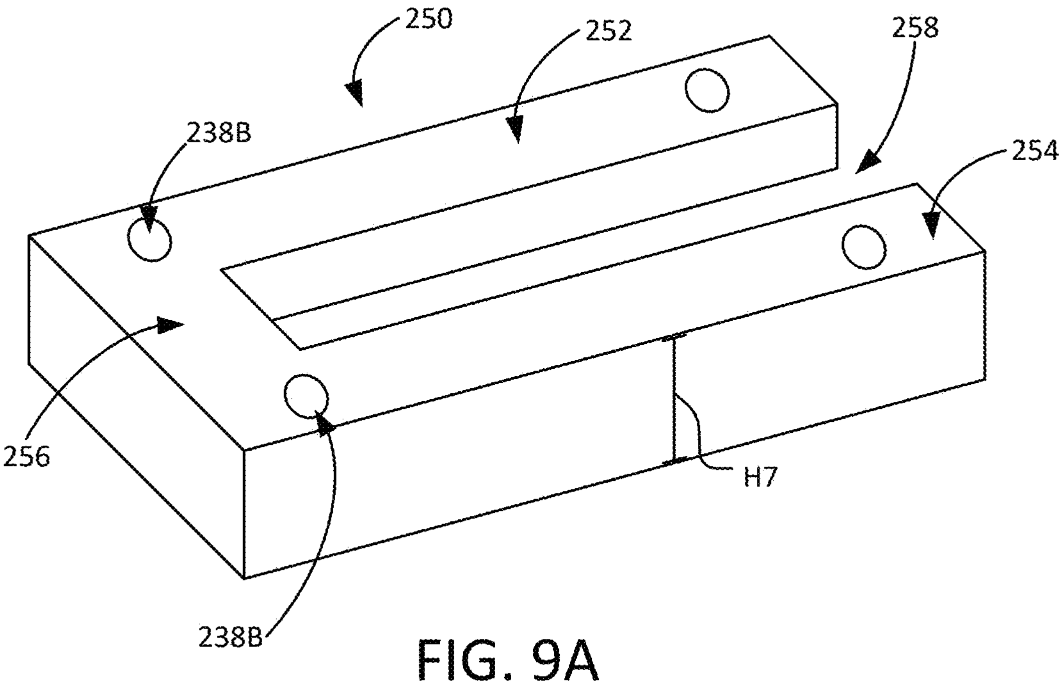
FIGS. 9A-9B are perspective views of a second piece of the masking system of FIG. 7, according to some aspects of the disclosure.
Figure 9B:
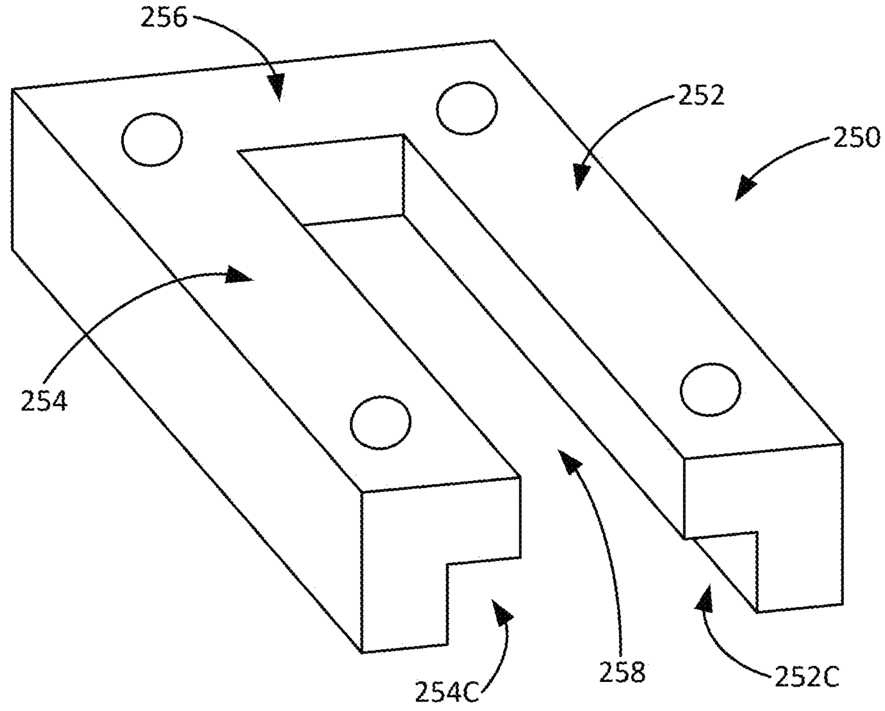

Second piece 250, shown in more detail in FIGS. 9A-9B, may include a first portion 252, a second portion 254, and a third portion 256. In some examples, first portion 252, second portion 254, and third portion 256 may each be cuboidal or generally cuboidal, and each may have a height H7. First portion 252 and second portion 254 may extend parallel to each other and may have a gap 258 therebetween. Third portion 256 may extend longitudinally between first portion 252 and second portion 254 and close gap 258 on one side. Gap 258 may be open at the opposing end. As such, the second piece 250 may have a generally squared-U shape. In other examples, second piece 250 may be formed in a spherical, cylindrical, or other symmetrical or asymmetrical shapes.

Figure 9C:
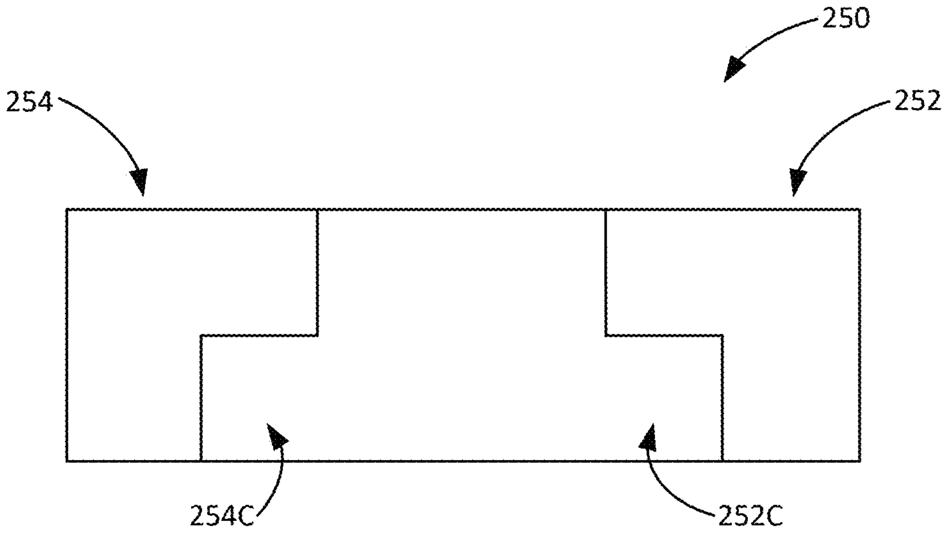
FIG. 9C is an end view of the second piece of the masking system of FIG. 7, according to some aspects of the disclosure.

First portion 252 of second piece 250 may, in some examples, have a cutout 252C that extends along the length of first portion 252 (see also FIG. 9C). Second portion 254 of second piece 250 may likewise have a cutout 254C that extends along the length of second portion 254. Cutout 252C and cutout 254C may face each other. As discussed herein, cutouts 252C and 254C may facilitate correspondence between first piece 210 and second piece 250 when the component, e.g., compressor blade 60, is retained within receiving area 242 of first piece 210.

In some examples, one or more openings 238B may extend through one or more of first portion 252, second portion 254, and third portion 256 of second piece 250. For instance, two openings 238B may extend through first portion 252 and two openings 238B may extend through second portion 254. Second piece 250 of masking system 200 may be configured to be secured to first piece 210 thereof. When second piece 250 is aligned with first piece 210 for securement as discussed herein, each opening 238B in second piece 250 may correspond to one opening 238A in first piece 210. A fastener or other device may then be passed through each set of openings 238A and 238B to fasten first piece 210 to second piece 250.

Figure 10A:
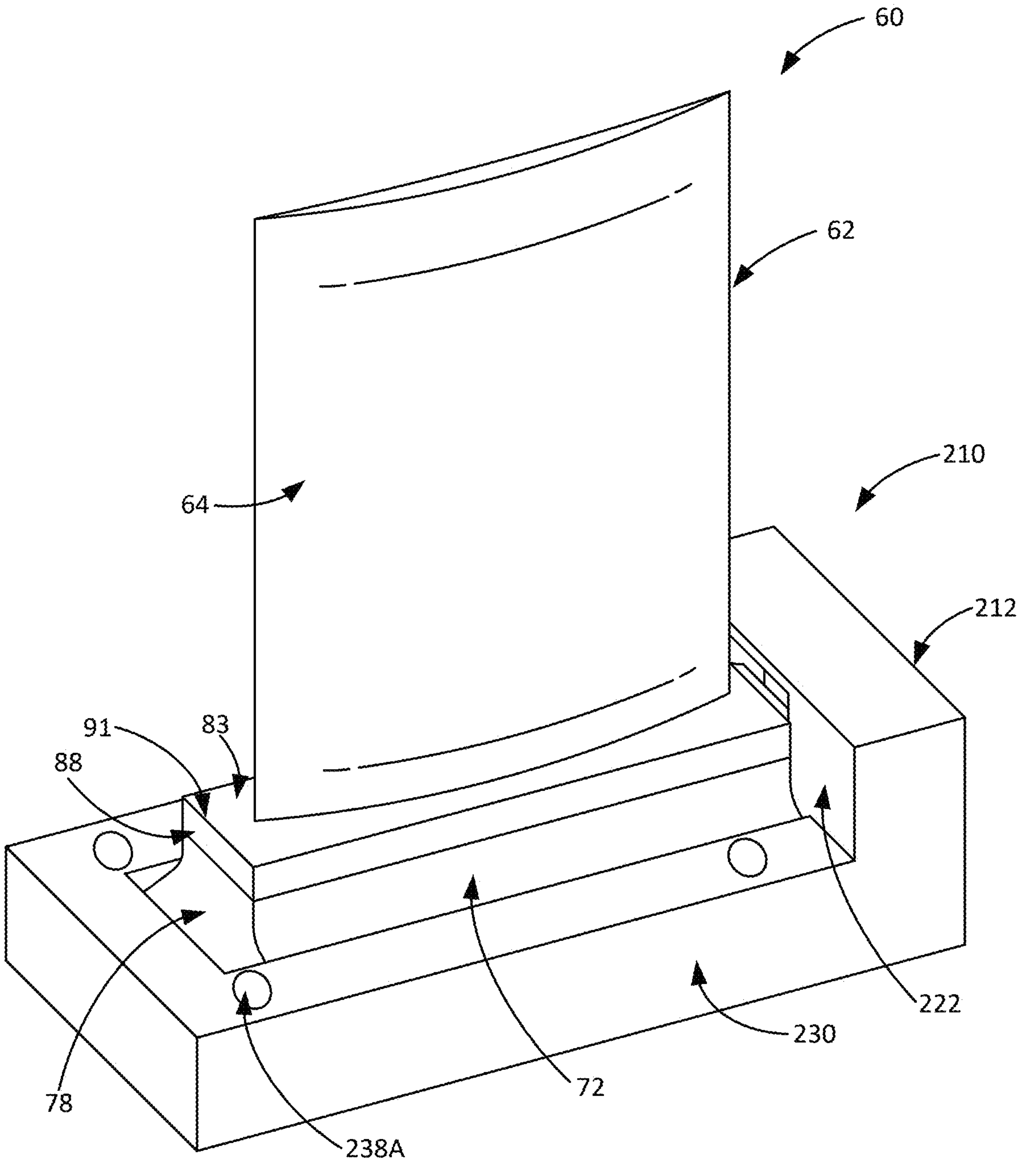
FIG. 10A is a perspective view illustrating a root of the compressor blade of FIGS. 3A-3D retained within a receiving area of the first piece of the masking system of FIG. 7, according to some aspects of the disclosure.
Figure 10B:
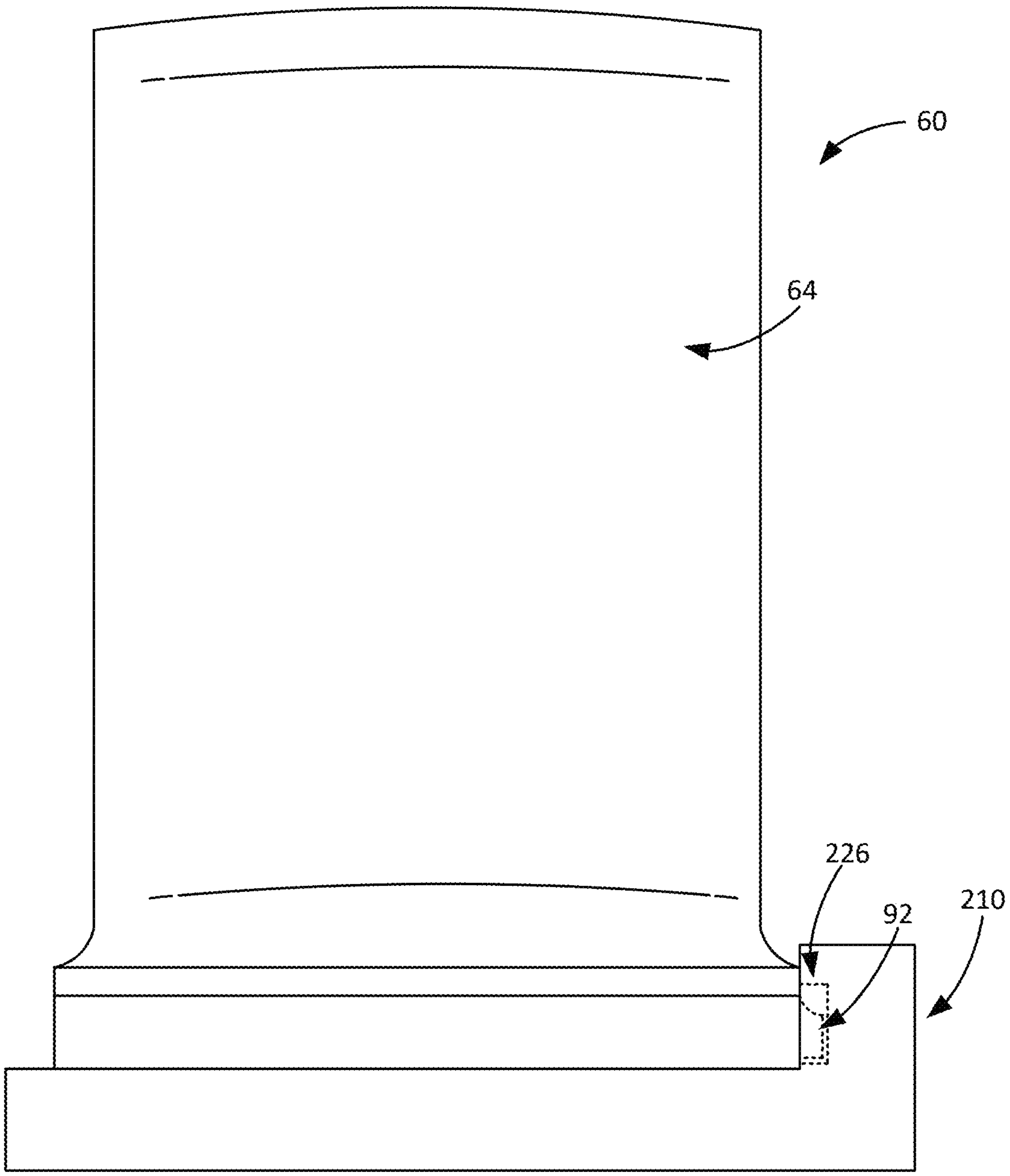
FIG. 10B is a side view illustrating a projection of the compressor blade of FIGS. 3A-3D disposed within a recessed area of the first piece of the masking system of FIG. 7, according to some aspects of the disclosure.

FIG. 10A shows a component, compressor blade 60 in this example, after root portion 72 thereof is insertably received or otherwise disposed within receiving area 242 (see FIGS. 8A-8B) of first piece 210. Root portion 72 may be disposed within receiving area 242 such that second end 80 (see FIG. 3D) of root portion 72 of compressor blade 60 is adjacent front wall 222 of first piece 210 and first end 78 of root portion 72 is spaced apart from front wall 222. When so configured, projection 92 of compressor blade 60 is received within recessed area 226 of first piece 210 (see FIG. 10B).

Figure 11:
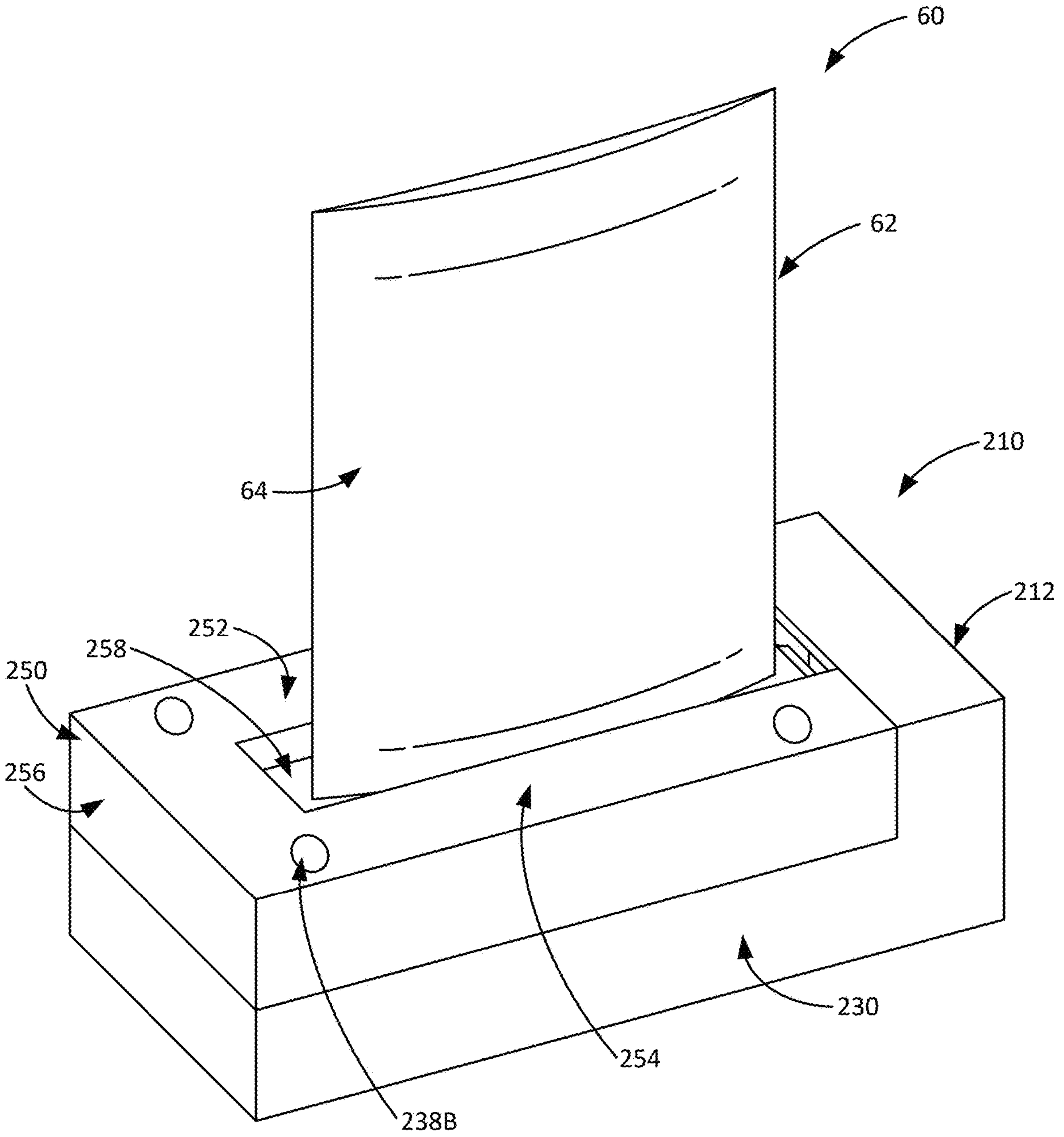
FIG. 11 is a perspective view illustrating the first piece and the second piece of the masking system of FIG. 7 collectively encapsulating the root of the compressor blade of FIGS. 3A-3D.

Second piece 250 may then be slid over first piece 210 such that one end of each of first portion 252 and second portion 254 of second piece 250 abuts front wall 222 of first piece 210, and third portion 256 of second piece 250 is spaced apart from front wall 222 of first piece 210 (see FIG. 11) and sits atop and generally corresponds to third member 236 of first piece 210. When so arranged, airfoil 62 may extend through gap 258 in second piece 250. Cutout 252C (see FIG. 9B) and cutout 254C in second piece 250 may ensure that root portion 72 and platform 83 do not interfere with second piece 250 when second piece 250 is slid over first piece 210. In some examples, the sum of height H6 (see FIG. 8A) and height H7 (see FIG. 9A) may equal height H4 (see FIG. 8A). That is, sum of height H6 of first member 232 of first piece 210 and height H7 of first portion 252 of second piece 250 may equal height H4 of first portion 212. Thus, when second piece 250 is slid over first piece 210 as discussed herein, top wall 214 of first piece 210, and the uppermost surfaces of first portion 252, second portion 254, and third portion 256 of second piece 250, may extend in the same or generally the same horizontal plane.

Figure 12:
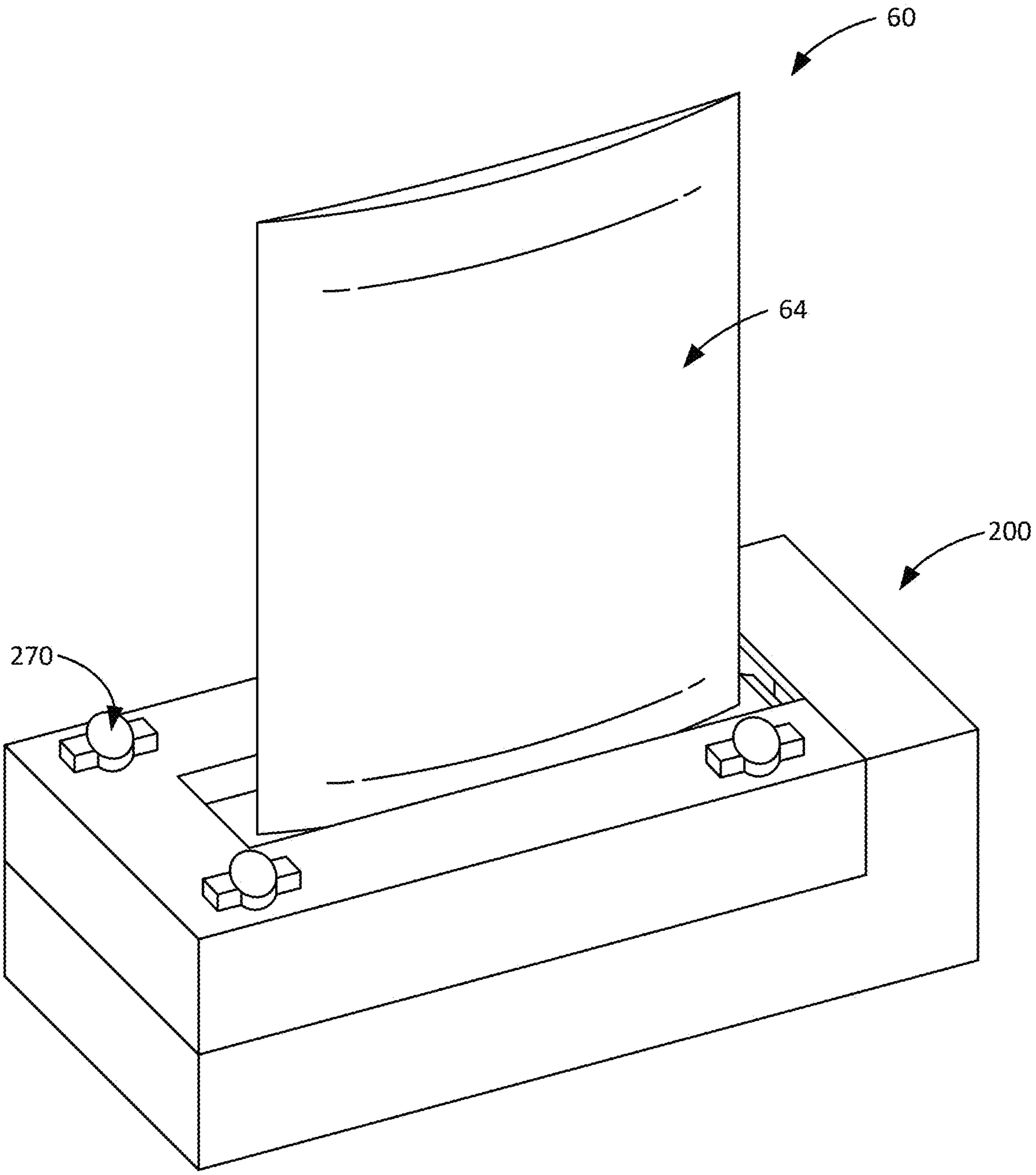
FIG. 12 is a perspective view illustrating the first piece and the second piece of the masking system of FIG. 7 secured to each other while the root of the compressor blade of FIGS. 3A-3D is encapsulated by the masking system.

Further, when second piece 250 is slid over or otherwise disposed over first piece 210, each opening 238A in first piece 210 may correspond to and align with one opening 238B in second piece 250. A fastener 270 (see FIG. 12) may be passed through each set of openings 238A and 238B to securely fasten first piece 210 to second piece 250 while root portion 72 of compressor blade 60 is retained within receiving area 242 of first piece 210. Fastener 270 may be a wingnut, a wire-tie, or any other suitable device for fastening first piece 210 to second piece 250.

In this configuration, root portion 72 of compressor blade 60, and each of first side 84, second side 86, first edge 88, and second edge 90 of platform 83 of compressor blade 60 (see FIGS. 3A-3D), may be encapsulated collectively by first piece 210 and second piece 250. Thus, first piece 210 and second piece 250 of masking system 200 may collectively and selectively mask compressor blade 60. Specifically, first piece 210 and second piece 250 may collectively mask each of root portion 72 and first side 84, second side 86, first edge 88, and second edge 90 of platform 83 of compressor blade 60 (see FIGS. 3A-3D) such that only airfoil 62 and top edge 91 of platform 83 are exposed. Compressor blade 60 may then be coated while it is retained within masking system 200. Masking system 200 may ensure that coating does not impact any portion of compressor blade 60 other than airfoil 62 and top edge 91 of platform 83, or at least that any impact to other portions of compressor blade 60 is minimized.

Once the coating process is complete, fasteners 270 may be unfastened to unsecure first piece 210 from second piece 250, and second piece 250 may be slidably disassociated or otherwise separated from first piece 210. The selectively-coated compressor blade 60 may be removed from receiving area 242. In some examples, masking system 200 may be reusable and may be used to selectively mask another component (e.g., another compressor blade 60) for coating.

Figure 13:
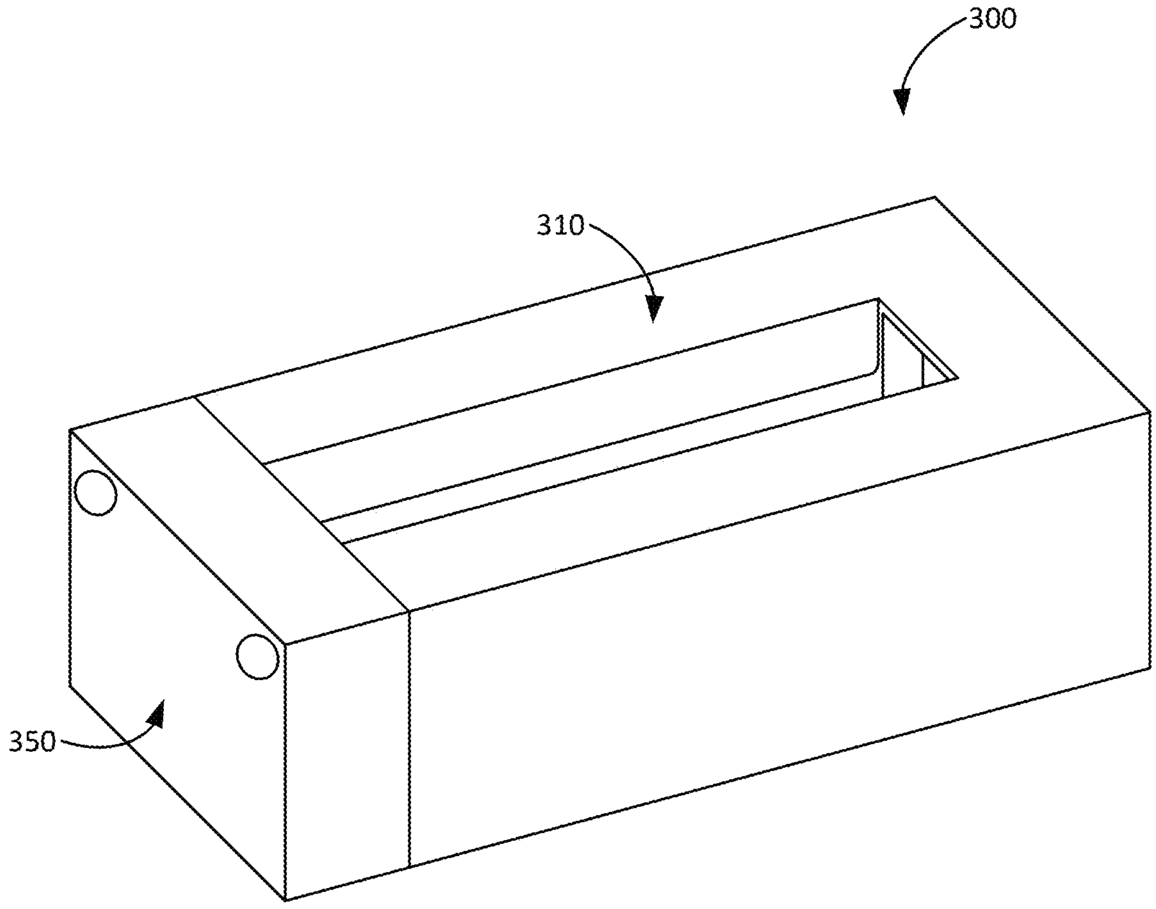
FIG. 13 is a perspective view of another masking system, according to some aspects of the disclosure.

FIG. 13 shows a masking system 300, according to an aspect of the disclosure. Masking system 300 may be configured to retain and selectively mask a component, such as compressor blade 60 or another component. In the illustrated example, masking system 300 may be configured to retain and selectively mask compressor blade 60 during a coating process such that only airfoil 62 and top edge 91 of platform 83 of compressor blade 60 is coated. Only the airfoil 62 and top edge 91 of platform 83 may need be coated since only the airfoil 62 and the top edge 91 of platform 83 of each compressor blade 60 may be in the hot gas path of gas turbine engine 1. That is, masking system 300 may mask root portion 72, and each of first side 84, second side 86, first edge 88, and second edge 90 of platform 83 of compressor blade 60, so as to ensure that these portions of compressor blade 60 are not coated with, or are only minimally impacted by, the coating. The coating may be an environmental barrier coating, a thermal barrier coating, or another coating.

Figure 14A:
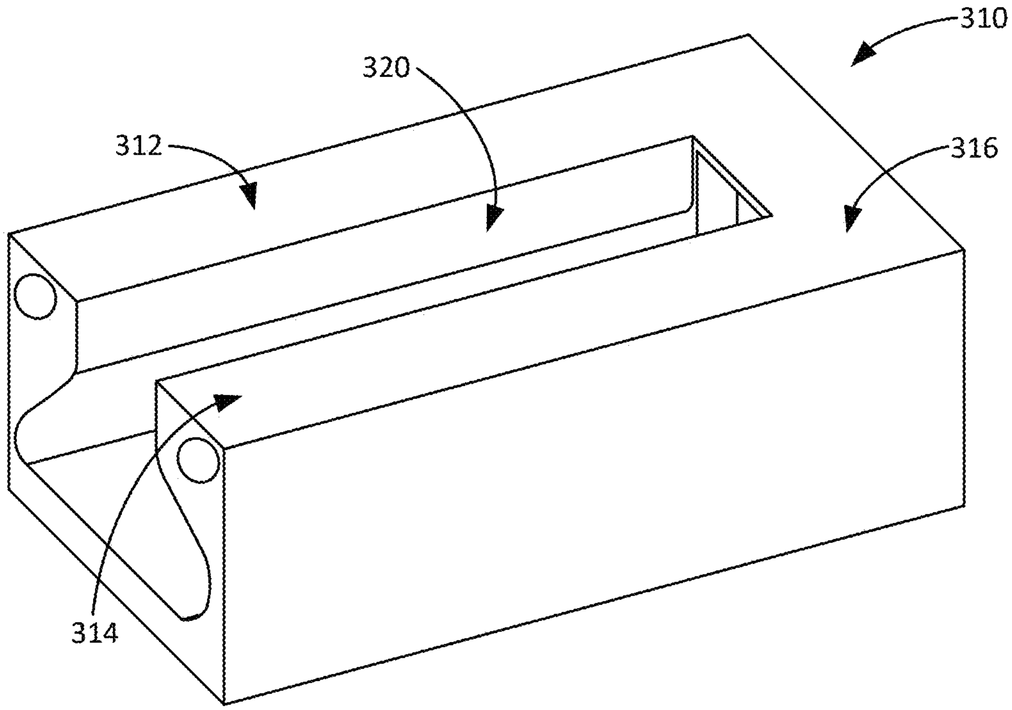
FIGS. 14A-14B are perspective views of a first piece of the masking system of FIG. 13, according to some aspects of the disclosure.
Figure 14B:
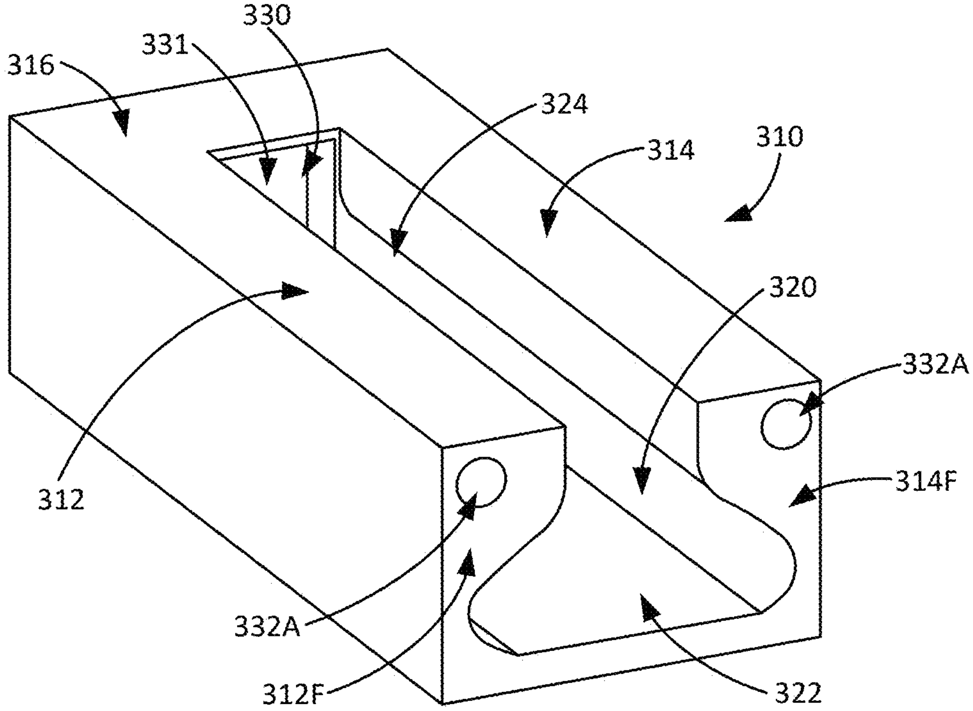
Figure 15:
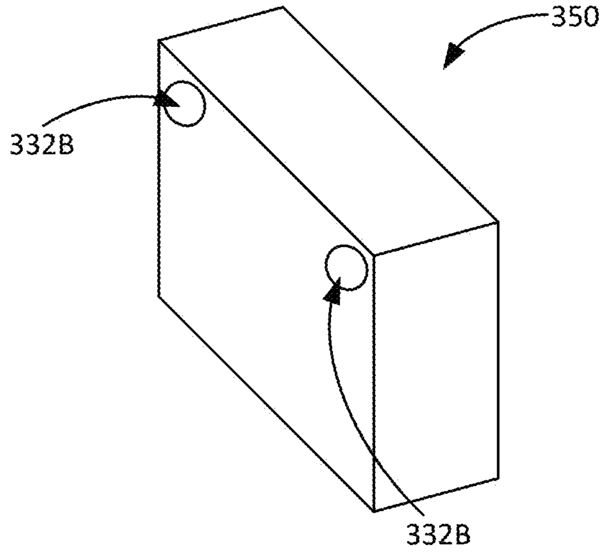
FIG. 15 is a perspective view of a second piece of the masking system of FIG. 13, according to some aspects of the disclosure.

Like masking system 200, masking system 300 may be a multi-component system. In some examples of the embodiments, masking system 300 may include a first piece 310 (see FIGS. 14A-14B) and a second piece 350 (see FIG. 15). First piece 310 and second piece 350 may be securable to each other or may otherwise be associated with each other. In some examples, compressor blade 60, e.g., root portion 72 thereof, may be slidably received within first piece 310. First piece 310 may partially or fully mask one or more of root portion 72, and first side 84, second side 86, first edge 88, and second edge 90 of platform 83 of compressor blade 60. Second piece 350 may then be secured to first piece 310 while compressor blade 60 (e.g., root portion 72 thereof) is retained within first piece 310. Second piece 350 may cooperate with first piece 310 to selectively mask compressor blade 60 such that each of root portion 72, and first side 84, second side 86, first edge 88, and second edge 90 of platform 83 of compressor blade 60 is masked generally in its entirety. Compressor blade 60, while it is retained within masking system 300, may then be coated. Masking system 300 may preclude or at least minimize application of coating (e.g., aluminide diffusion coating or another coating) to the root portion 72 and/or one or more of first side 84, second side 86, first edge 88, and second edge 90 of platform 83 of compressor blade 60.

First piece 310 (FIGS. 14A-14B) of masking system 300 may include a first portion 312, a second portion 314, and a third portion 316. In some examples, first piece 310 may be a unitary piece. First portion 312 and second portion 314 may extend generally laterally parallel and spaced apart from each other. Third portion 316 may extend longitudinally between first portion 312 and second portion 314 at one respective end thereof.

First piece 310 may have a receiving area 320. In some examples, receiving area 320 may be formed at least in part by second portion 314 and third portion 316, and specifically, inner surfaces thereof. Receiving area 320 may have a generally bulbous bottom area 322 and a generally cuboidal top area 324, each of which may be open from at least one end. The bulbous shape of bottom area 322 may generally correspond to shape of root portion 72 of compressor blade 60. The generally cuboidal shape of top area 324 may generally correspond to shape of platform 83 compressor blade 60. As discussed herein, receiving area 320 may be configured to slidably receive root portion 72 of compressor blade 60.

A recessed area 330 may be formed within third portion 316. Recessed area 330 may be accessible through receiving area 320 and may be adjacent receiving area 320. In some examples, recessed area 330 may be configured to receive projection 92 of compressor blade compressor blade 60. The back of recessed area 330 may be closed by a rear wall 331 that extends generally vertically and is spaced apart from receiving area 320.

First portion 312 of first piece 310 may include a front surface 312F and second portion 314 of first piece 310 may include a front surface 314F. These front surfaces 312F and 314F may extend generally vertically parallel to rear wall 331. One or more openings 332A may be provided in each of front surface 312F and front surfaces 314F. Length of openings 332A may be less than a length of receiving area 320, i.e., openings 332A and 332B may not extend all the way through first piece 310.

Second piece 350 (see FIG. 15) may generally be formed in the shape of a cuboid and may have a unitary construction. In some examples, a height of second piece 350 may be the same as a height of first piece 310. Second piece 350 may have one or more openings 332B that extend therethrough. When second piece 350 is disposed adjacent and in contact with first piece 310, each opening 332A in first piece 310 may correspond with one opening 332B in second piece 350. A fastener or other device may then be passed through each set of openings 332A and 332B to fasten first piece 310 to second piece 350.

Figure 16A:
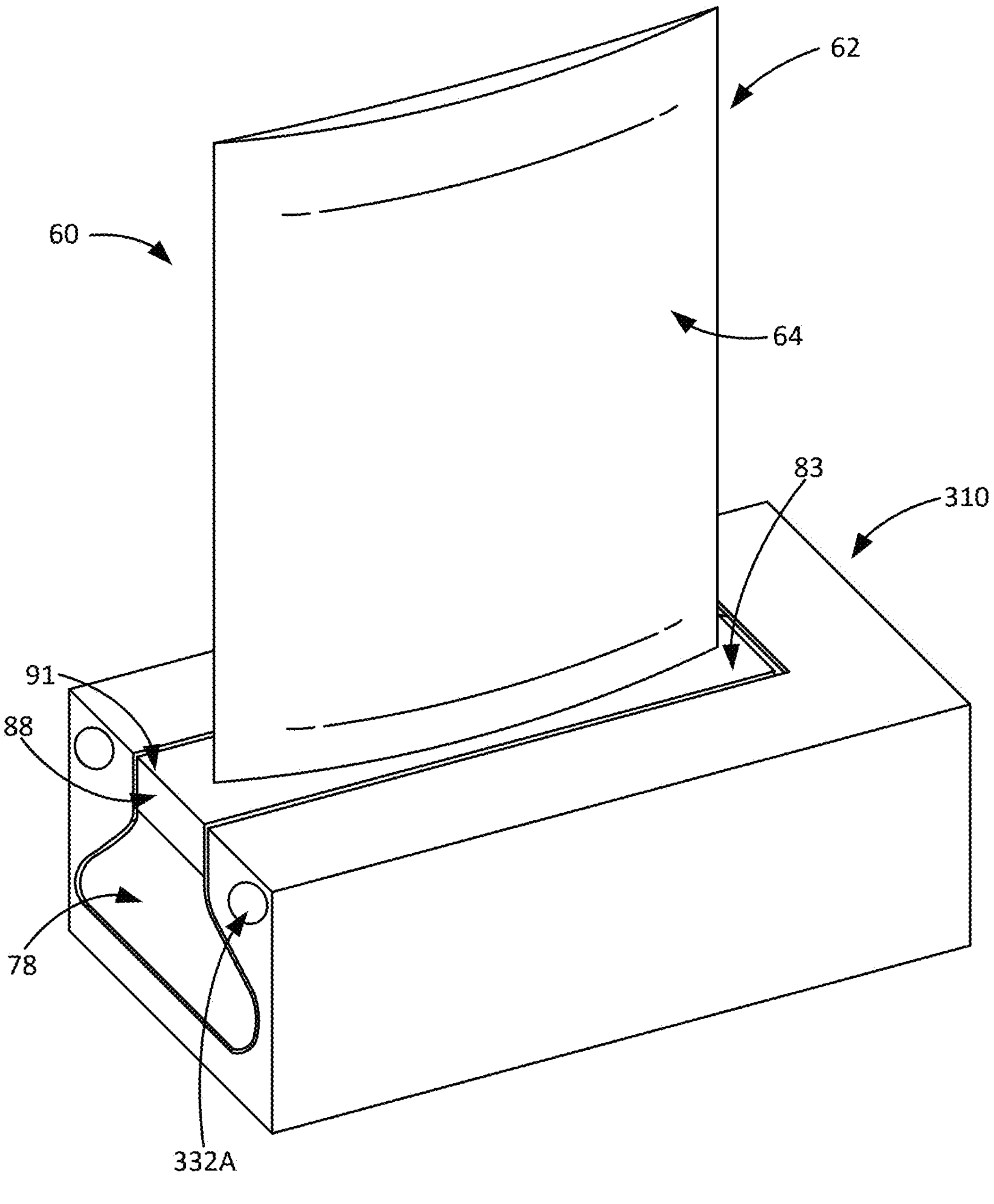
FIG. 16A is a perspective view illustrating the root of the compressor blade of FIGS. 3A-3D retained within a receiving area of the first piece of the masking system of FIG. 13, according to some aspects of the disclosure.
Figure 16B:
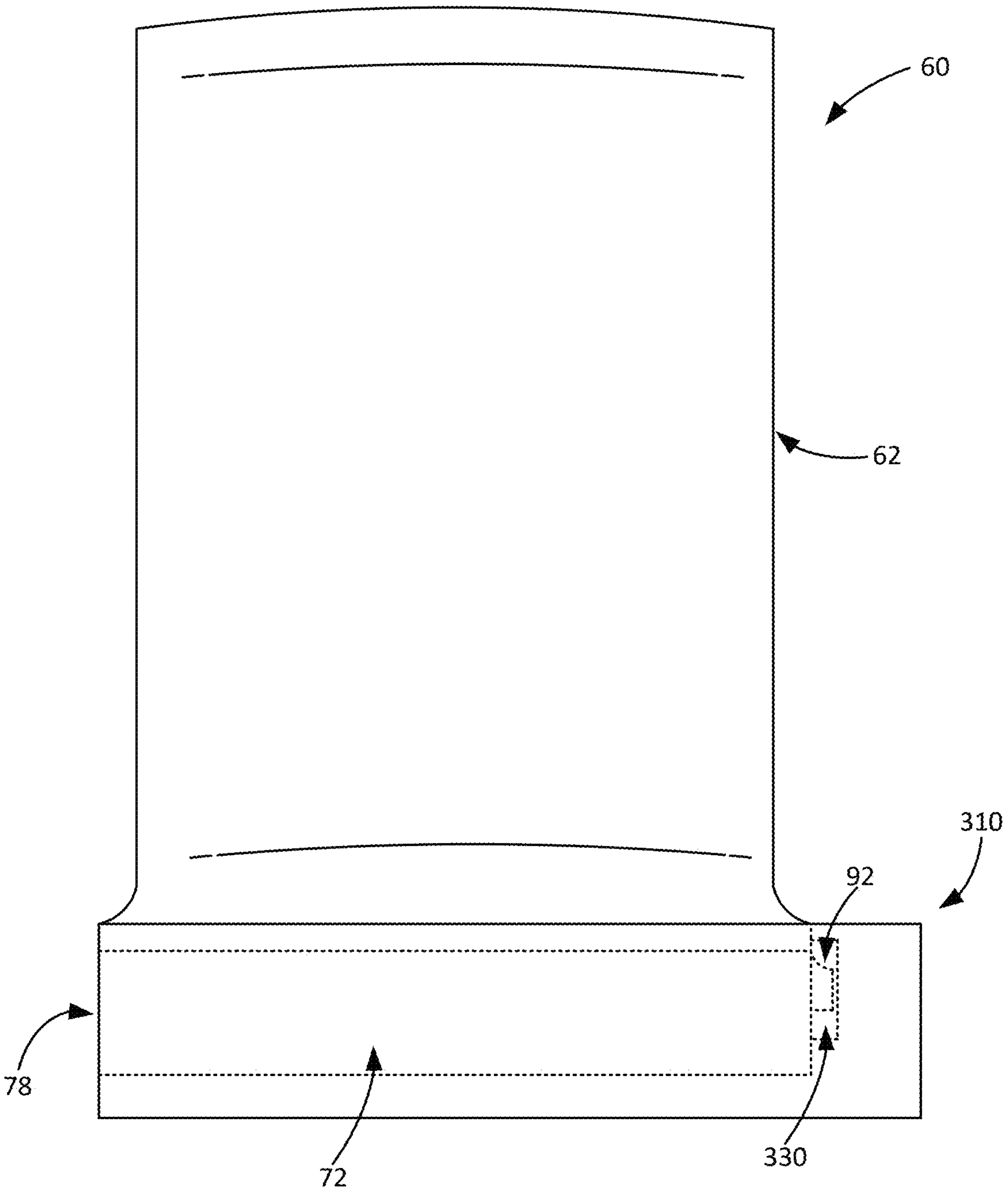
FIG. 16B is a side view illustrating a projection of the compressor blade of FIGS. 3A-3D disposed within a recessed area of the first piece of the masking system of FIG. 13, according to some aspects of the disclosure.

Focus is directed to FIGS. 16A-16B, which show compressor blade 60 after root portion 72 thereof has been slidably inserted into receiving area 320 of first piece 310. Specifically, root portion 72 of compressor blade 60 may be placed adjacent receiving area 320 such that second end 80 (see FIG. 3B) of root portion 72 faces rear wall 331 of recessed area 330. Root portion 72 may then be slid generally laterally into receiving area 320 such that second end 80 of root portion 72 is proximate (e.g., abuts) recessed area 330. As shown in FIG. 16B, when so configured, projection 92 of compressor blade 60 may enter recessed area 330 and be housed therein. Airfoil 62 may extend above top area 324 of receiving area 320.

Figure 17:
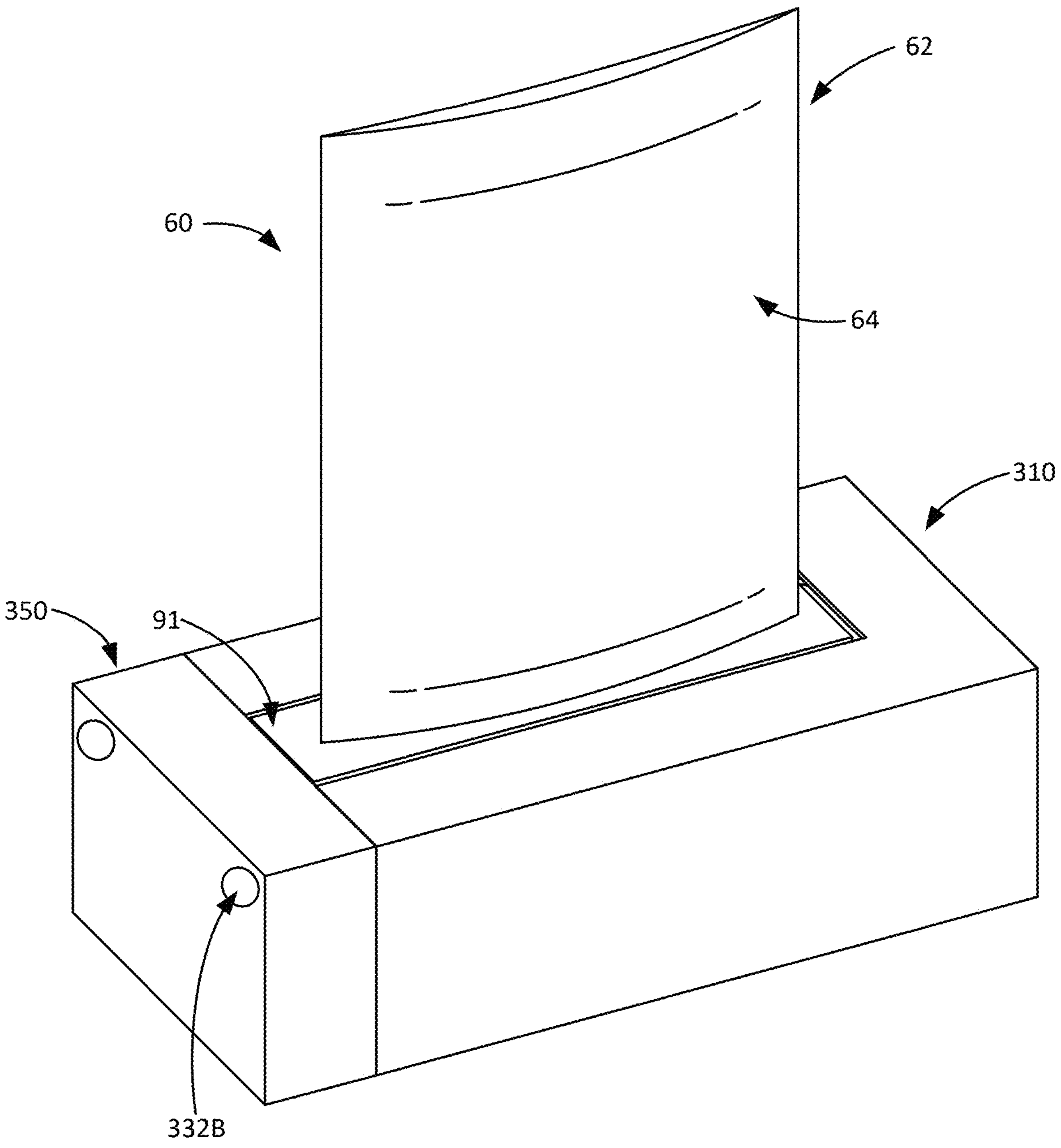
FIG. 17 is a perspective view illustrating the first piece and the second piece of the masking system of FIG. 13 collectively encapsulating the root of the compressor blade of FIGS. 3A-3D.

As shown in FIG. 17, second piece 350 of masking system 300 may be disposed adjacent and in contact with first piece 310 such that each opening 332A in first piece 310 is aligned with one opening 332B in second piece 350. Second piece 350 may effectively close off receiving area 320 such that first end 78 of root portion 72 and first edge 88 of platform 83 is covered. First piece 310 and second piece 350 may now collectively and selectively mask compressor blade 60 such that only airfoil 62 and top edge 91 of platform 83 of compressor blade 60 are exposed. That is, masking system 300 may mask root portion 72, and each of first side 84, second side 86, first edge 88, and second edge 90 of platform 83 of compressor blade 60.

Figure 18:
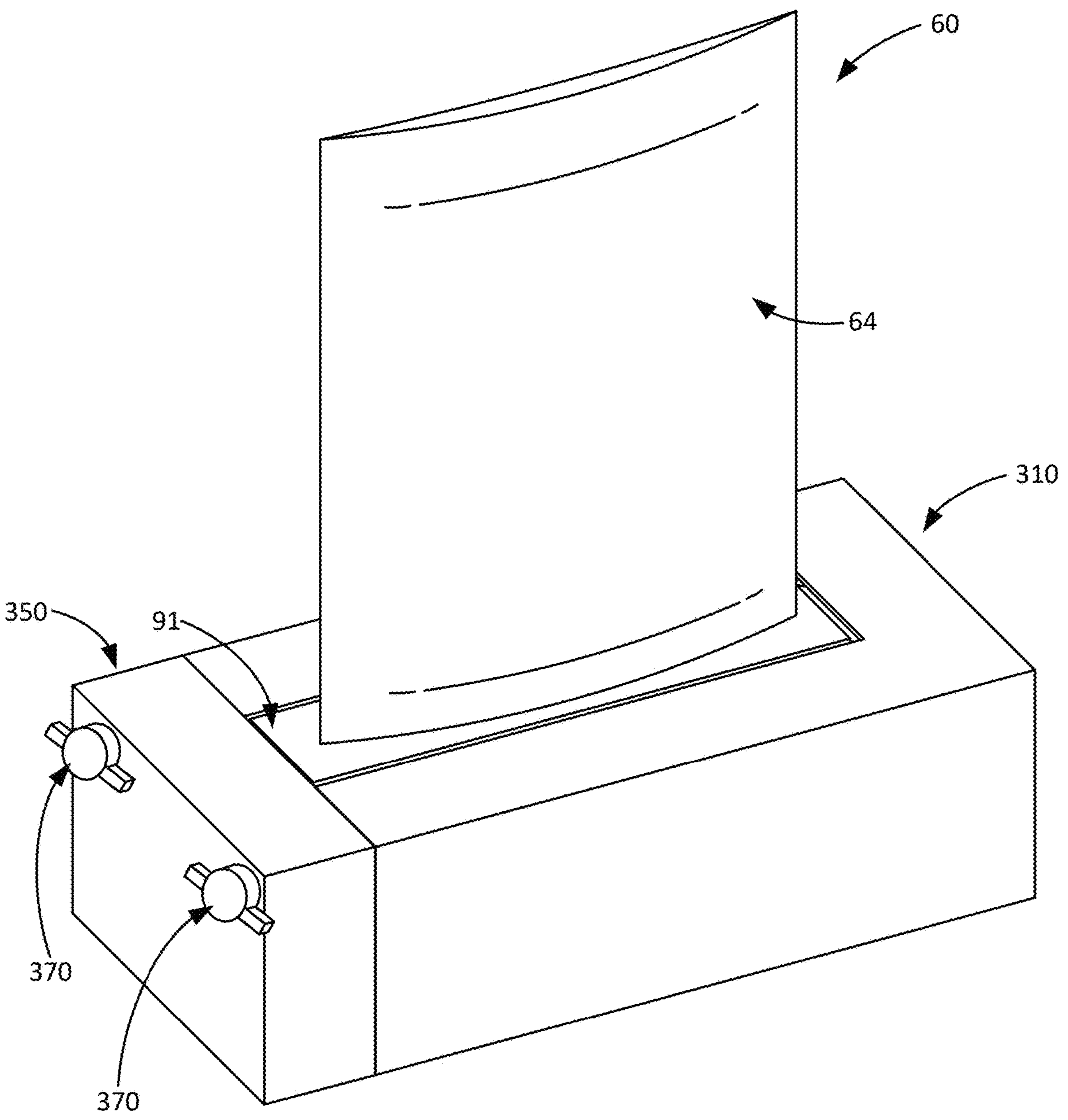
FIG. 18 is a perspective view illustrating the first piece and the second piece of the masking system of FIG. 13 secured to each other while the root of the compressor blade of FIGS. 3A-3D is encapsulated by the masking system.

As shown in FIG. 18, second piece 350 may be fastened to first piece 310 via fasteners 370 while root portion 72 is retained within receiving area 320 and projection 92 is housed within recessed area 330. Specifically, a fastener 370 may be passed through each set of openings 332A and 332B to secure first piece 310 to second piece 350. Like fastener 270 of masking system 200, each fastener 370 of masking system 300 may be a wingnut, a wire-tie, or any other suitable device for fastening first piece 310 to second piece 350.

Compressor blade 60 may now be selectively coated while root portion 72 is disposed within receiving area 320 and projection 92 is retained within recessed area 330. Masking system 300 may preclude or at least minimize application of coating to any of root portion 72, and first side 84, second side 86, first edge 88, and second edge 90 of platform 83 of compressor blade 60. Once the coating is complete, fasteners 370 may be unfastened to unsecure first piece 310 from second piece 350, and root portion 72 may be slid out of receiving area 320 to disassociate compressor blade 60 from first piece 310. In some examples, masking system 300 may be reusable and may be used to selectively mask another component (e.g., another compressor blade 60) for coating.

Figure 19:
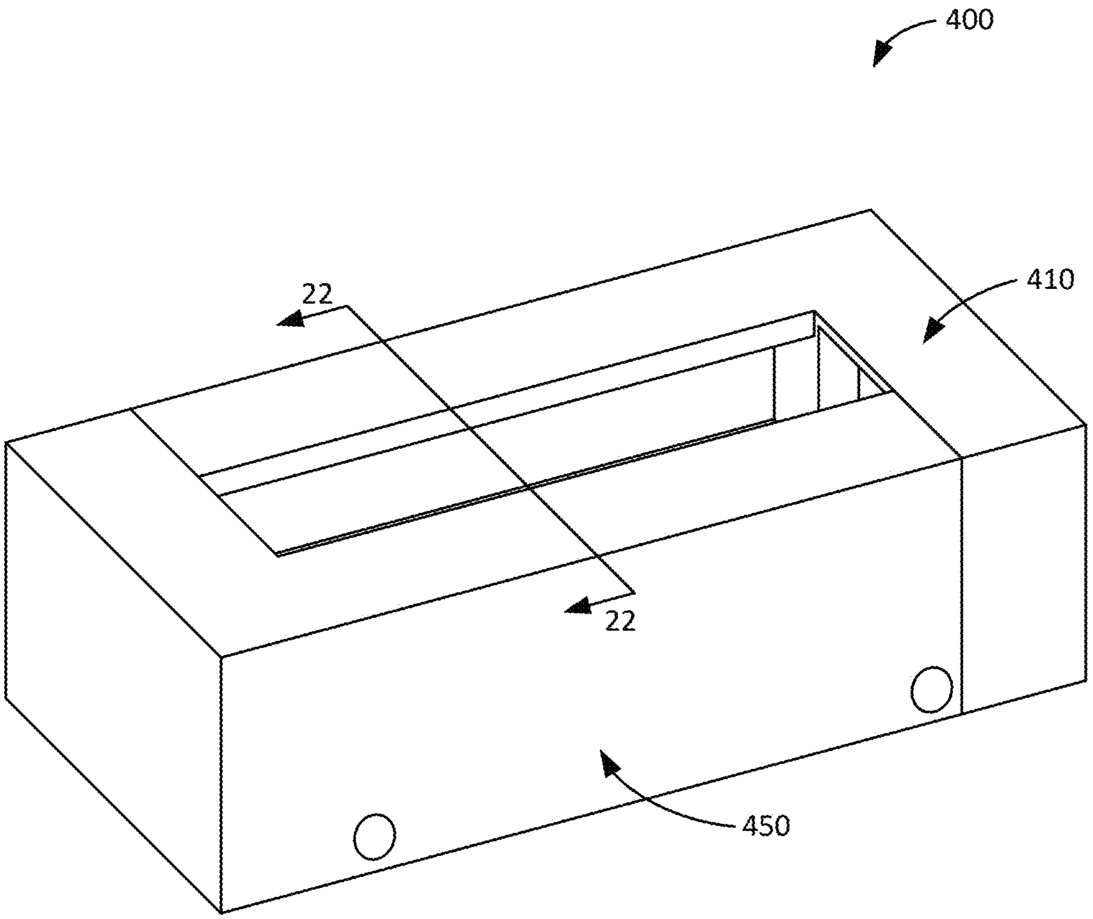
FIG. 19 is a perspective view of another masking system, according to some aspects of the disclosure.

Focus is directed to FIG. 19, which shows masking system 400 according to an aspect of the disclosure. Masking system 400 may be configured to retain and selectively mask a component, such as compressor blade 60 or another component. In the illustrated example, masking system 400 may be configured to retain and selectively mask compressor blade 60 during a coating process such that only airfoil 62 and top edge 91 of platform 83 of compressor blade 60 are coated. That is, masking system 400 may mask root portion 72, and each of first side 84, second side 86, first edge 88, and second edge 90 of platform 83 of compressor blade 60, so as to ensure that these portions of compressor blade 60 are not coated with, or are only minimally impacted by, the coating. The coating may be an environmental barrier coating, a thermal barrier coating, or another coating.

Like masking system 200 and masking system 300, masking system 400 may be a multi-component masking system. In some examples of the embodiments, masking system 400 may include a first piece 410 (see FIGS. 20A-20B) and a second piece 450 (see FIGS. 21A-21B). First piece 410 and second piece 450 may be securable to each other or may otherwise be couplable or mated with each other. In some examples, compressor blade 60, e.g., root portion 72 thereof, may be received within a receiving area of first piece 410. First piece 410 may partially or fully mask one or more of root portion 72, and first side 84, second side 86, first edge 88, and second edge 90 of platform 83 of compressor blade 60. Second piece 450 may then be secured to first piece 410 while compressor blade 60 is retained within receiving area 444 of first piece 410. Second piece 450 may cooperate with first piece 410 to selectively mask compressor blade 60 such that each of root portion 72, and first side 84, second side 86, first edge 88, and second edge 90 of platform 83 of compressor blade 60 is masked generally in its entirety. Compressor blade 60, while it is retained within masking system 400, may then be coated. Masking system 400 may preclude or at least minimize application of coating (e.g., aluminide diffusion coating or another coating) to the root portion 72 and/or one or more of first side 84, second side 86, first edge 88, and second edge 90 of platform 83 of compressor blade 60.

Figure 20A:
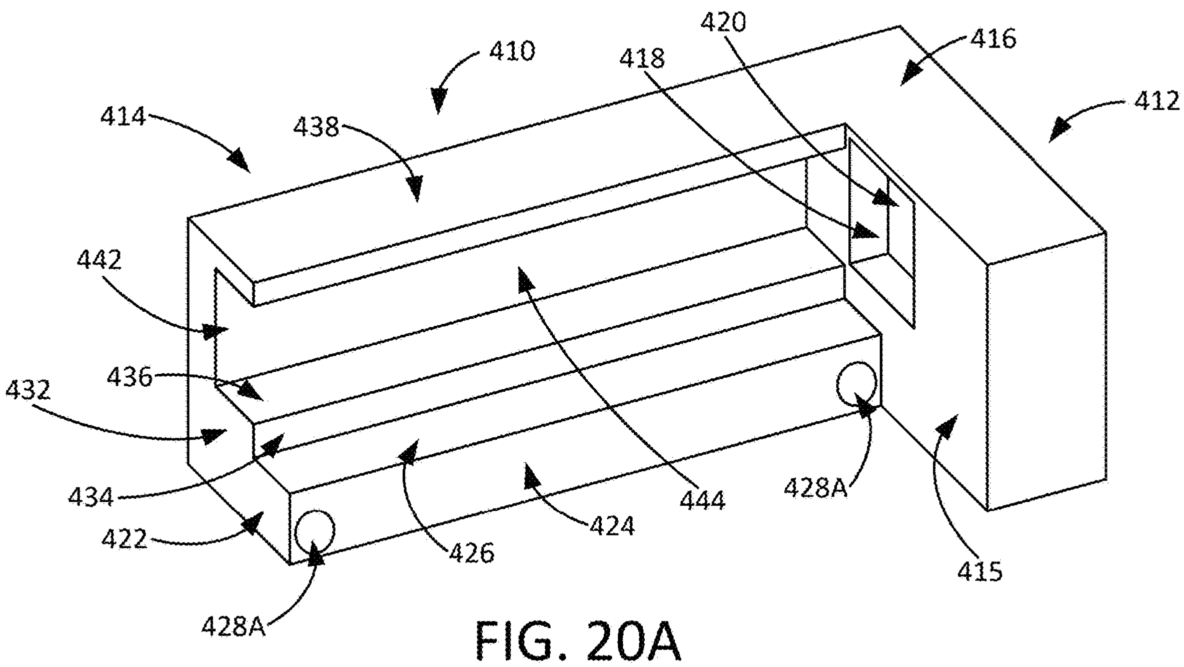
FIGS. 20A-20B are perspective views of a first piece of the masking system of FIG. 19, according to some aspects of the disclosure.
Figure 20B:
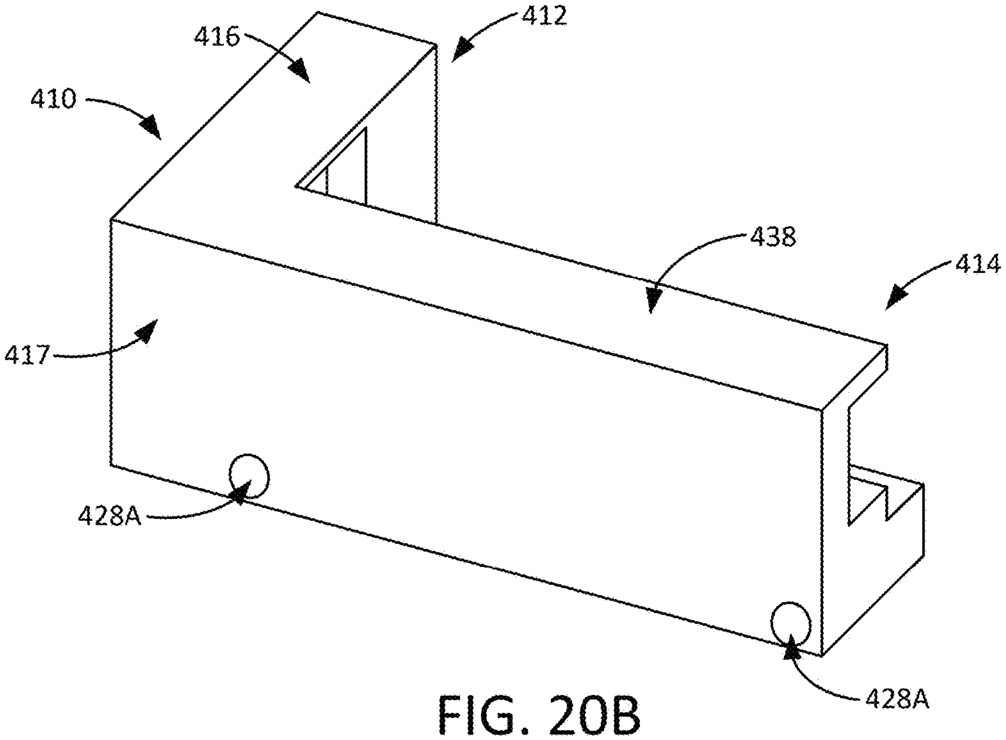
Figure 21A:
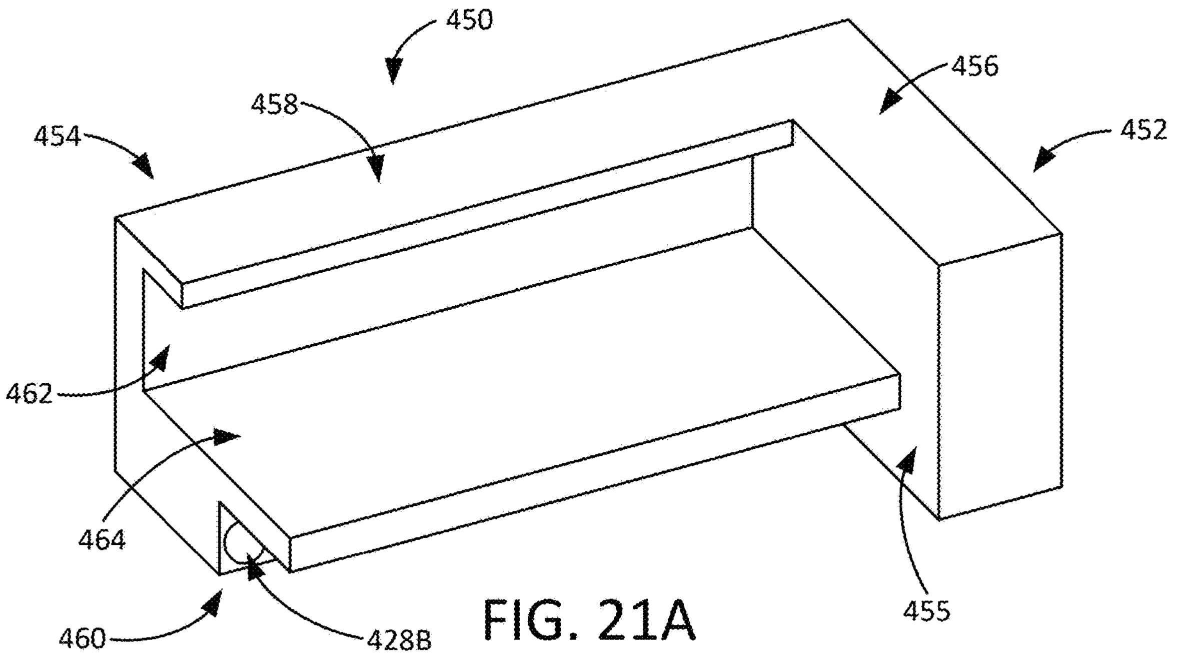
FIGS. 21A-21B are perspective views of a second piece of the masking system of FIG. 19, according to some aspects of the disclosure.
Figure 21B:
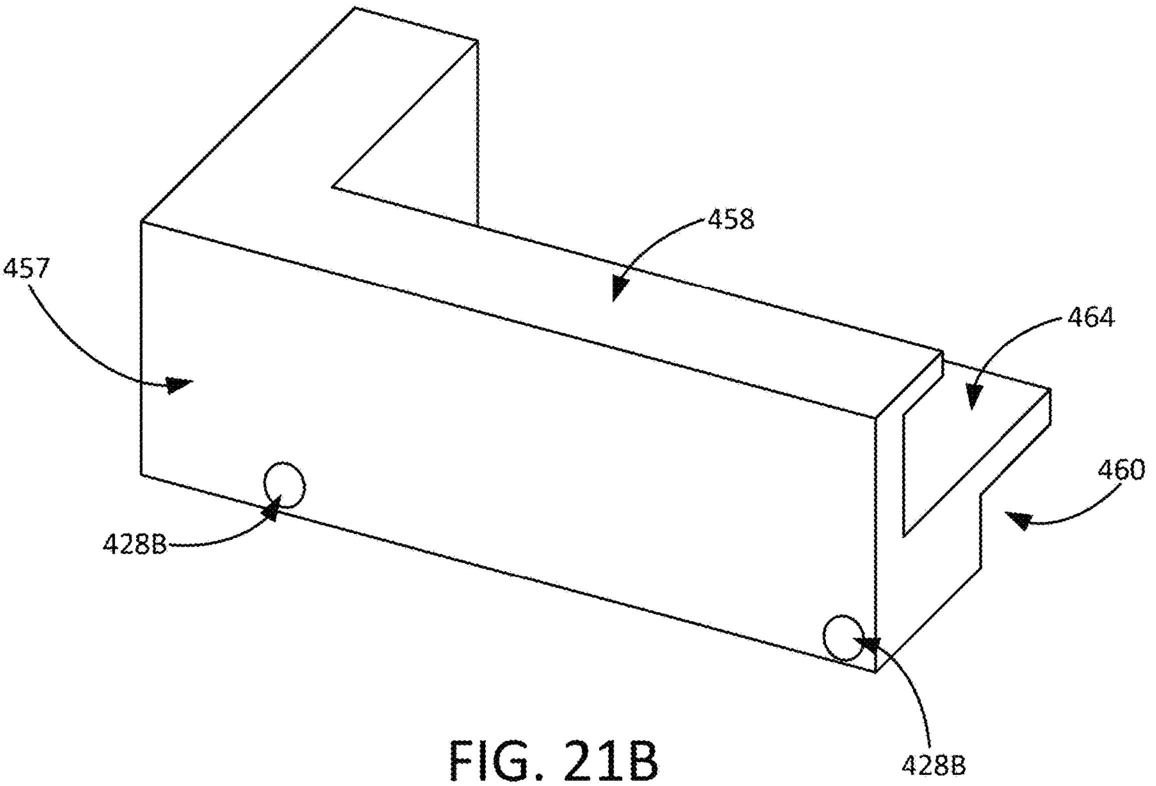

Attention is directed to FIGS. 20A-20B. First piece 410 may include a first portion 412 and a second portion 414. In some examples, first piece 410 may be of unitary construction.

First portion 412 may, in some examples, be formed as a cuboid. In other examples, first portion 412 may be spherical, cylindrical, pyramidal, or be formed in other symmetrical or asymmetrical shapes. First portion 412 may have a front wall 415 and a top wall 416. In some examples, first portion 412 may include a recessed area 418. Recessed area 418 may extend from front wall 415 to a rear wall 420 that is spaced apart from and extends parallel to front wall 415. Recessed area 418 may be configured to house projection 92 of compressor blade 60.

Second portion 414 may extend generally perpendicularly from front wall 415 of first portion 412. Second portion 414 may include a rear wall 417 (see FIG. 20B) and one or more stairstep structures. For example, second portion 414 may include a first stairstep structure 422 and a second stairstep structure 432, each of which extend perpendicularly from front wall 415 of first portion 412. First stairstep structure 422 may include a riser 424 and a lower support 426. Riser 424 may extend generally vertically, and lower support 426 may extend generally perpendicularly from riser 424 to give first stairstep structure 422 a general stairstep shape. In some examples, riser 424 may include one or more openings 428A that extend through or partway through second portion 414.

Second stairstep structure 432 may have a riser 434 and an upper support 436. Riser 434 may extend generally vertically from lower support 426, and upper support 436 may extend generally perpendicularly from riser 434. Thus, lower support 426 and upper support 436 may be spaced apart and may extend parallel to each other, and riser 424 and riser 434 may be spaced apart and may extend parallel to each other and to rear wall 417.

Second portion 414 may have a top wall 438. Top wall 438 of second portion 414 and top wall 416 of first portion 412 may extend in the same horizontal plane. A sidewall 442 may extend generally vertically from upper support 436 to top wall 438. Top wall 438, sidewall 442, and upper support 436 may collectively define receiving area 444. As discussed herein, receiving area 444 may be configured to receive compressor blade 60, and specifically, root portion 72 thereof.

Second piece 450, in some examples, may have a unitary construction. Second piece 450 (see FIGS. 21A-21B) may have a first portion 452 and a second portion 454. First portion 452 may, in some examples, be formed as a cuboid. In other examples, first portion 452 may be spherical, cylindrical, pyramidal, or be formed in other symmetrical or asymmetrical shapes. First portion 452 may have a front wall 455 and a top wall 456.

Second portion 454 may extend generally perpendicularly from front wall 455 of first portion 452. Second portion 454 may include a rear wall 457 (see FIG. 21B) that extends generally vertically, and a top wall 458 that extends generally perpendicularly from rear wall 457.

Second portion 454 may have a first sidewall 460 and a second sidewall 462, each of which may extend generally vertically and may be spaced apart from each other. First sidewall 460 may have one or more openings 428B that extend from first sidewall 460 to rear wall 457. That is, openings 428B may extend through second piece 450. A shelf 464 may be disposed above first sidewall 460. Shelf 464 may extend from second sidewall 462 generally horizontally beyond first sidewall 460.

Figure 22:
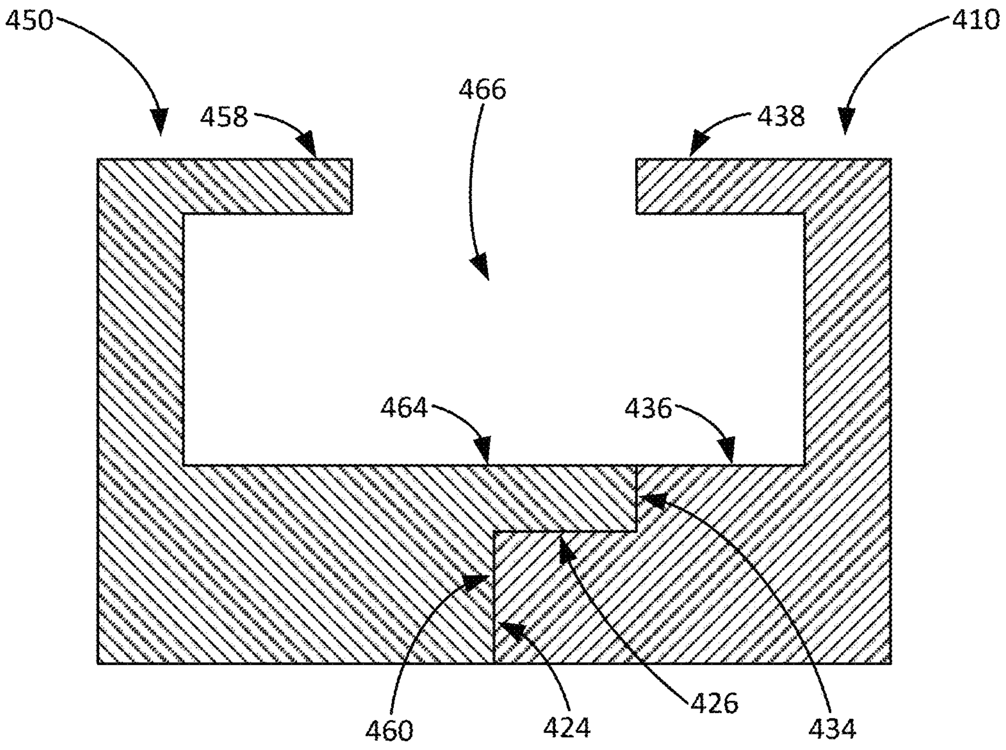
FIG. 22 is a section view illustrating interaction between the first piece and the second piece of the masking system of FIG. 19, according to some aspects of the disclosure.

First piece 410 and second piece 450 may be complementary and may be configured to be secured to each other. Specifically, as shown in FIG. 22, first piece 410 and second piece 450 may be configured such that riser 424 of first piece 410 faces and contacts first sidewall 460 of second piece 450. When so configured, surface of shelf 464 of second piece 450 may rest atop lower support 426 of first piece 410 and abut riser 434, and each of upper support 436 of first piece 410 and uppermost surface of shelf 464 of second piece 450 extend generally continuously in the same horizontal plane. When first piece 410 and second piece 450 are arranged in this fashion, each opening 428A in first piece 410 may correspond to and align with one opening 428B in second piece 450.

Figure 24:
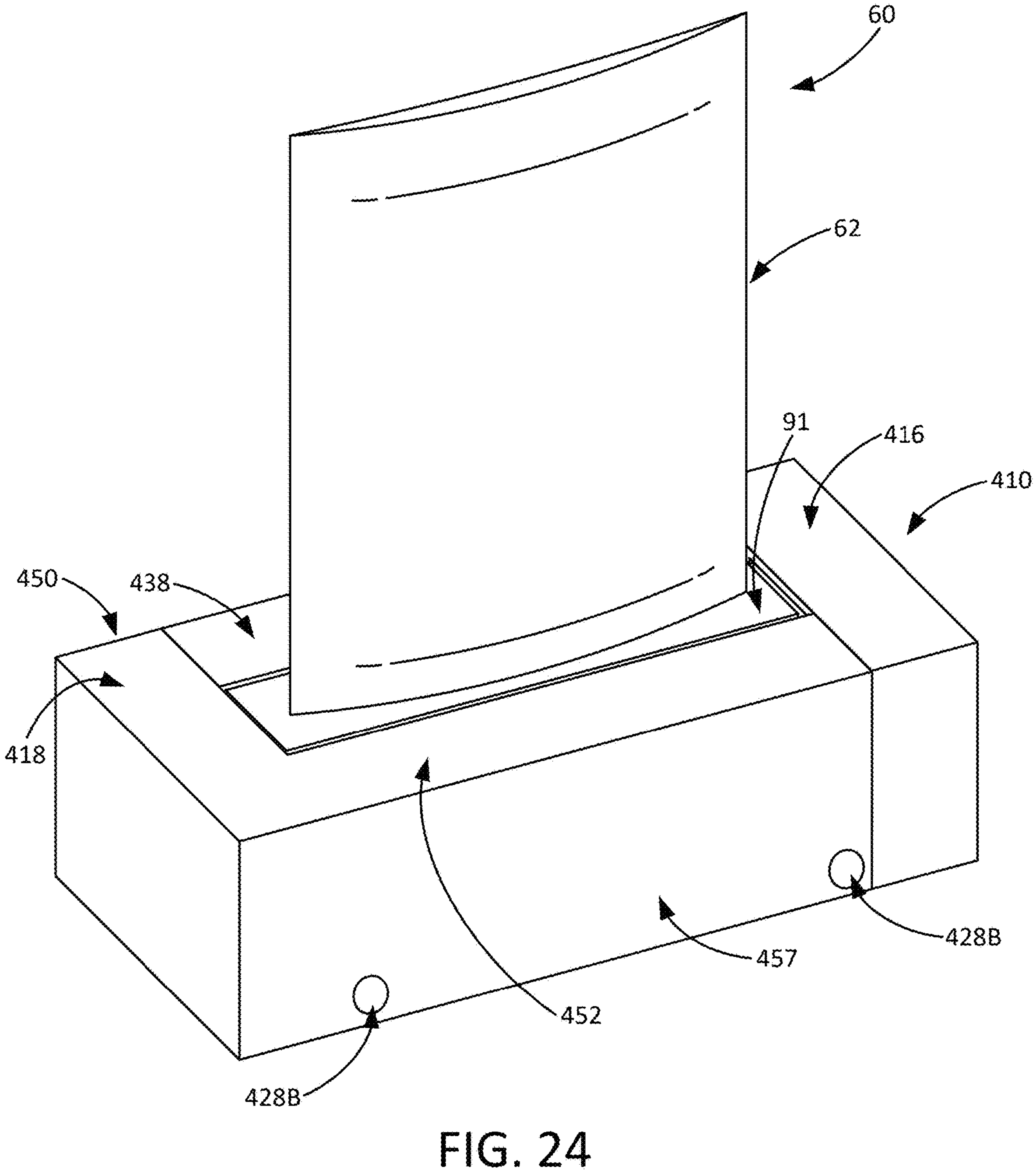
FIG. 24 is a perspective view illustrating the first piece and the second piece of the masking system of FIG. 19 collectively encapsulating the root of the compressor blade of FIGS. 3A-3D, according to some aspects of the disclosure.

A gap 466 (see FIG. 22) may be defined collectively by first piece 410 and second piece 450. Specifically, top wall 438 of second portion 414 of first piece 410 and top wall 458 of second portion 454 of second piece 450 may define the lateral boundaries of a gap 466 (see FIG. 22), and the longitudinal boundaries of the gap 466 may be defined by top wall 416 of first portion 412 of first piece 410 and top wall 456 of first portion 452 of second piece 450. The gap 466 may be sized to accommodate platform 83 such that only top edge 91 thereof is exposed (see FIG. 24).

Figure 23A:
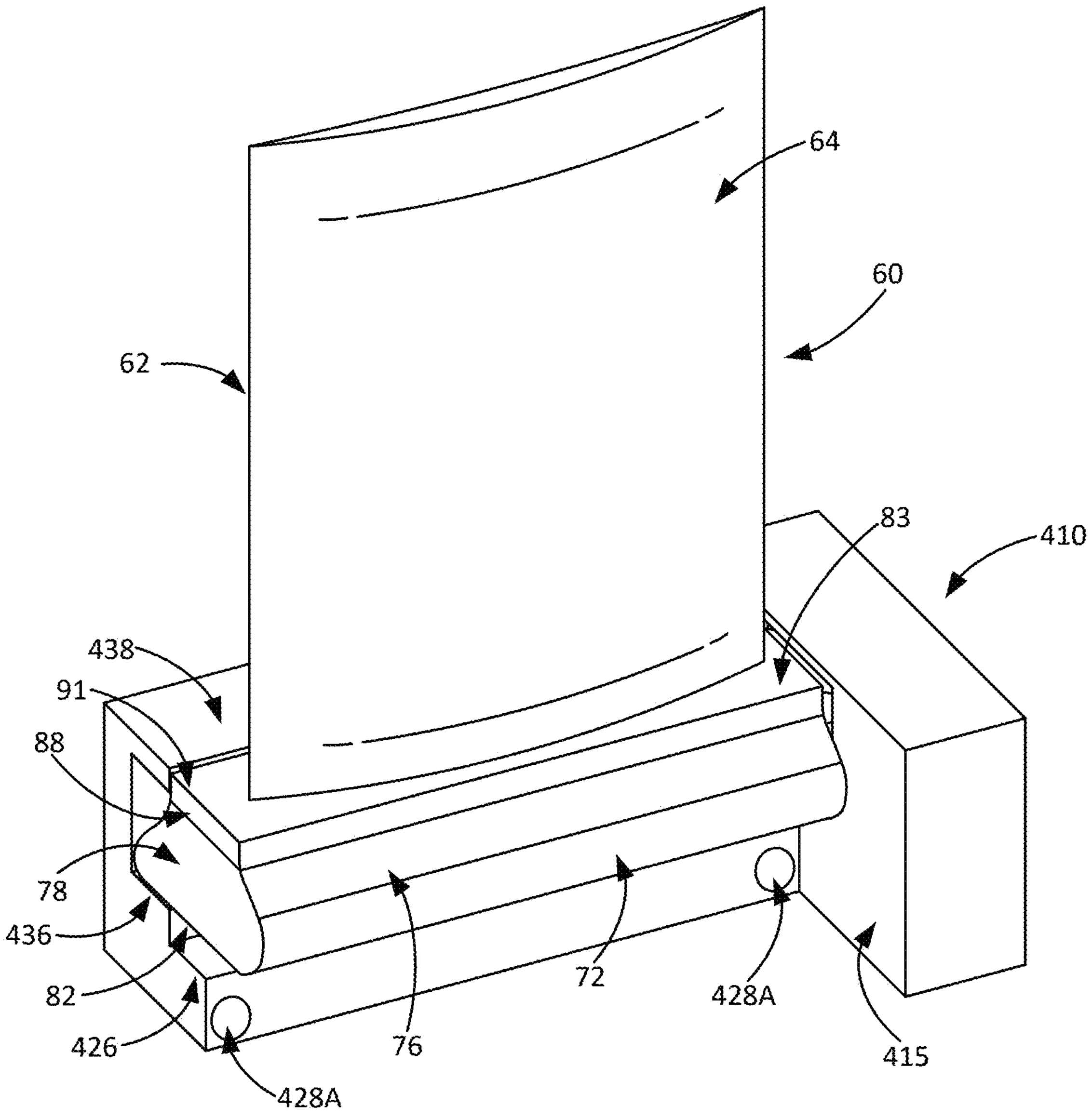
FIG. 23A is a perspective view illustrating the root of the compressor blade of FIGS. 3A-3D housed in a receiving area of the first piece of the masking system of FIG. 19, according to some aspects of the disclosure.

Masking system 400, i.e., first piece 410 and second piece 450 collectively, may be used to retain and selectively mask compressor blade 60. For example, as shown in FIG. 23A, compressor blade 60, and specifically root portion 72 thereof, may be disposed in receiving area 444 such that bottom side 82 of root portion 72 of compressor blade 60 rests atop upper support 436 of first piece 410. In this configuration, top edge 91 of platform 83 of compressor blade 60 may align with and extend in the same horizontal plane as top wall 438 of first piece 410, and bottom side 82 of root portion 72 may be spaced apart from and extend above lower support 426.

Figure 23B:
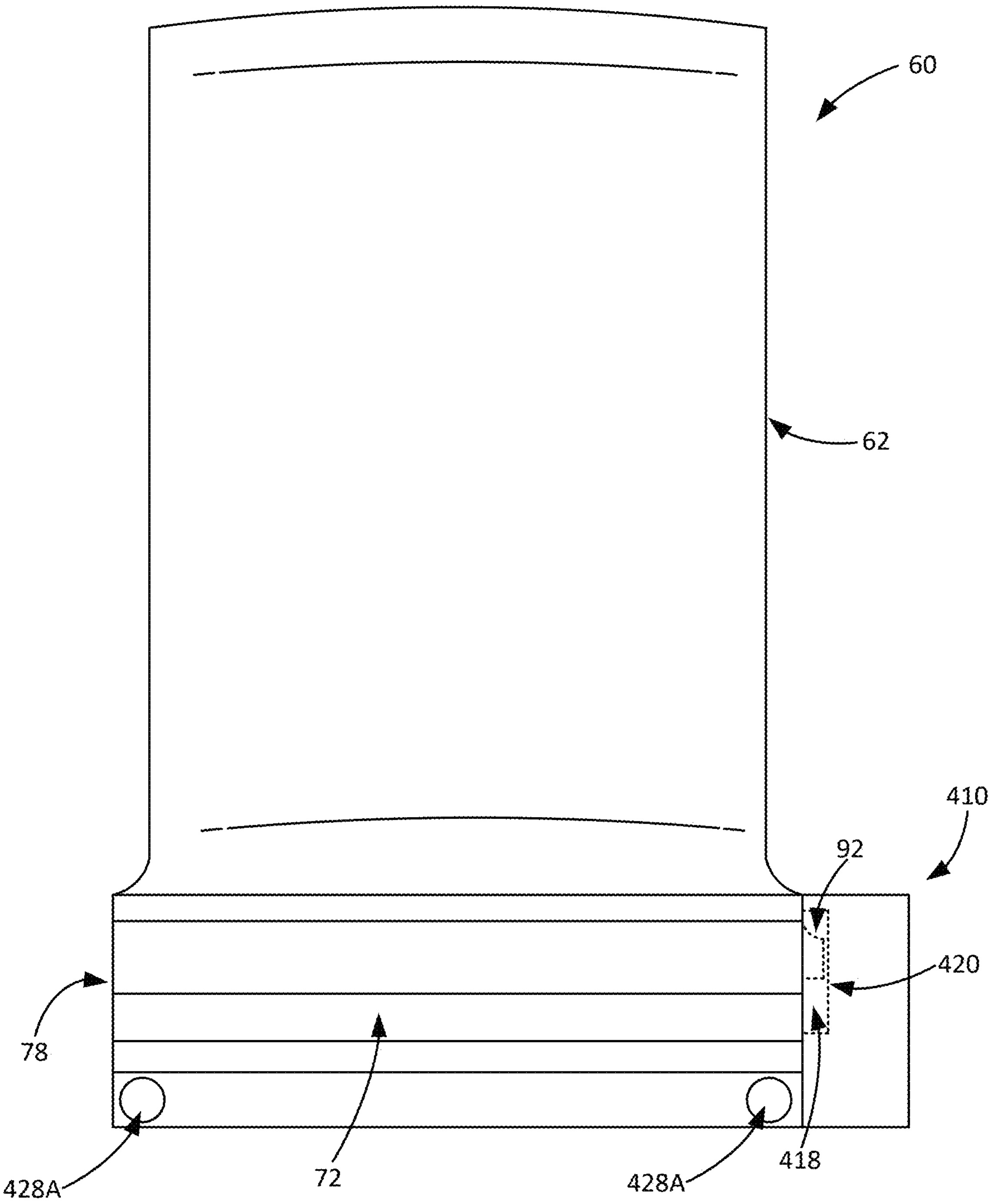
FIG. 23B is a side view illustrating a projection of the compressor blade of FIGS. 3A-3D disposed within a recessed area of the first piece of the masking system of FIG. 19, according to some aspects of the disclosure.

As shown in FIG. 23B, when bottom side 82 of root portion 72 of compressor blade 60 is disposed on upper support 436 (see FIG. 21A) in this fashion, projection 92 of compressor blade 60 may extend into and reside within recessed area 418 of first piece 410. Thus, second end 80 (see FIG. 3D) of root portion 72 may be made to abut front wall 415 of first piece 410 notwithstanding projection 92. Width of bottom side 82 of root portion 72 may be greater than width of upper support 436, and therefore, part of root portion 72 may overhang upper support 436.

While root portion 72 of compressor blade 60 is disposed within receiving area 444 of first piece 410 as shown in FIG. 23A, second piece 450 may be brought into alignment with first piece 410. Specifically, as discussed above with reference to FIG. 22, second piece 450 may be arranged such that shelf 464 of second piece 450 sits atop lower support 426 of first piece 410. Bottom side 82 of root portion 72 of compressor blade 60 may therefore be supported by each of upper support 436 of first piece 410 and shelf 464 of second piece 450. Top edge 91 of platform 83 may close (e.g., fully or partially) gap 466 (see FIG. 22) and top edge 91 of platform 83 may generally extend in the same horizontal plane as each of top wall 416 of first portion 412 of first piece 410, top wall 438 of second portion 414 of first piece 410, top wall 456 of first portion 412 of second piece 450, and top wall 458 of second portion 454 of second piece 450. Airfoil 62 may extend above gap 466.

Figure 25:
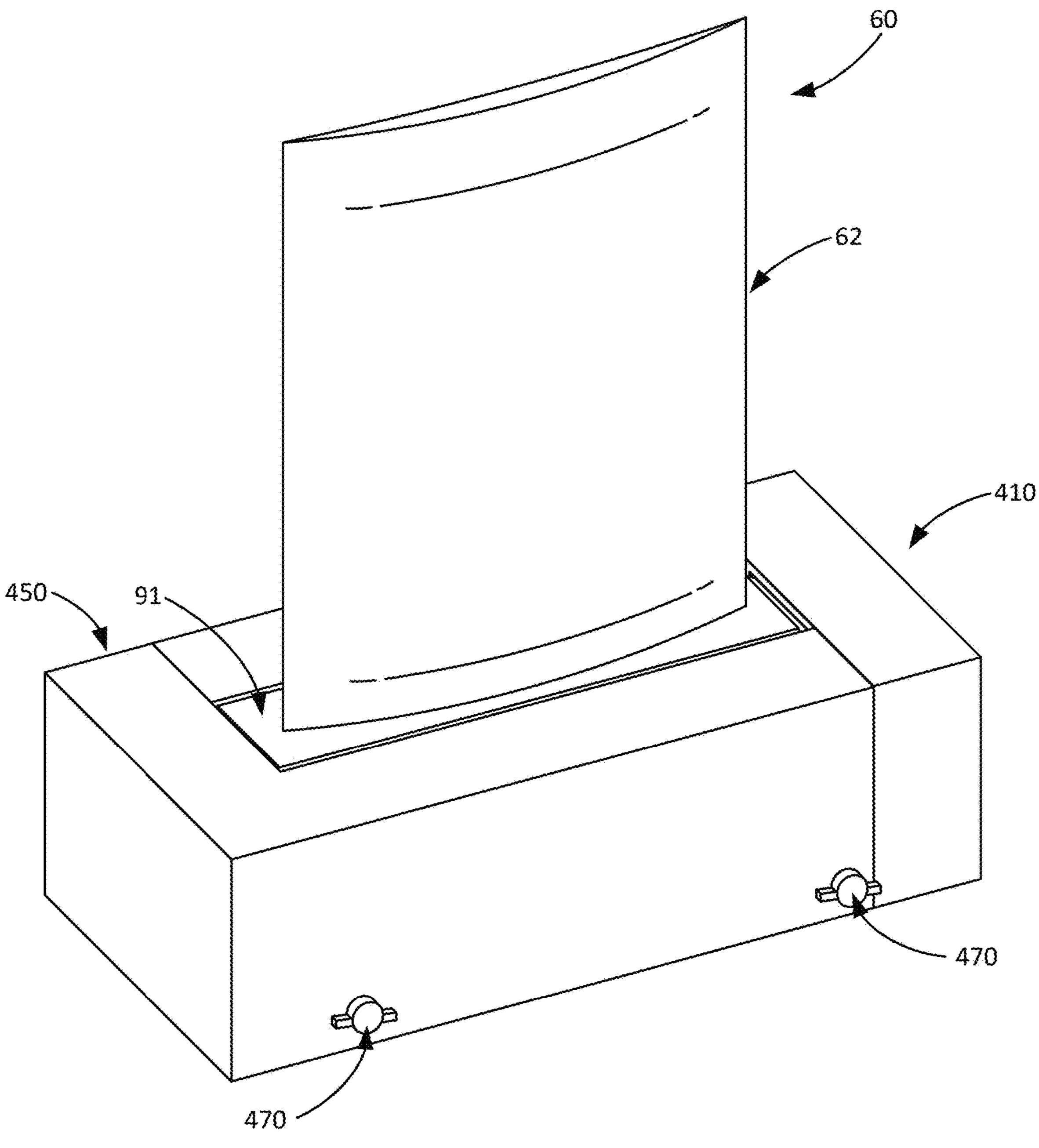
FIG. 25 is a perspective view illustrating the first piece and the second piece of the masking system of FIG. 19 secured to each other while the root of the compressor blade of FIGS. 3A-3D is encapsulated by the masking system, according to some aspects of the disclosure.

As discussed above, when first piece 410 and second piece 450 are brought into alignment with each other, each opening 428A in first piece 410 may correspond to and align with one opening 428B in second piece 450. A fastener 470 (see FIG. 25) may be passed through each set of openings 428A and 428B to securely fasten first piece 410 to second piece 450 while root portion 72 of compressor blade 60 is retained within masking system 400. Fastener 470 may be a wingnut, a wire-tie, or any other suitable device for fastening first piece 410 to second piece 450.

After first piece 410 and second piece 450 are fastened to each other, compressor blade 60 may be coated while it is retained within masking system 400. Top edge 91 of platform 83 and airfoil 62 may be exposed and receive coating as desired. Root portion 72, and each of first side 84, second side 86, first edge 88, and second edge 90 of platform 83 of compressor blade 60 may be masked by masking system 400, and may be unimpacted by or may only be minimally impacted by the coating.

Once the coating is complete, fasteners 470 may be unfastened to unsecure first piece 410 from second piece 450. Compressor blade 60, and specifically root portion 72 thereof, may be dissociated from masking system 400. In some examples, masking system 400 may be reusable and may be used to selectively mask another component (e.g., another compressor blade 60) for coating.

The masking systems disclosed herein, e.g., each of masking system 200, masking system 300, and masking system 400, may be fabricated through a variety of processes and from a variety of materials (e.g., metals, polymers, et cetera). In some examples of the embodiments, one or more components of masking system 200, masking system 300, and/or masking system 400 may be manufactured using conventional machining and assembly techniques. In other examples of the embodiments, one or more components of masking system 200, masking system 300, and/or masking system 400 may be constructed using a suitable additive manufacturing or additive printing technique. There are several known additive printing methods, such as a material extrusion method, a material jetting method, a binder jetting method, a sheet lamination method, a vat photo-polymerization method, a powder bed fusion method, a directed energy deposition (DED) method, et cetera. Any one or more of these methods, or any other additive manufacturing method, now known or hereinafter developed, may be employed to manufacture one or more components of masking system 200, masking system 300, and/or masking system 400. In some examples, first piece 210 of masking system 200 may be additively manufactured as a unitary piece and second piece 250 of masking system 200 may be additively manufactured as a unitary piece. Similarly, each of first piece 310 and second piece 350 of masking system 300 may be additively manufactured as a unitary piece; and each of first piece 410 and second piece 450 of masking system 400 may be additively manufactured as a unitary piece.

In some examples, one or more components of masking system 200, masking system 300, and/or masking system 400 may be manufactured using the same material or materials (e.g., metal or metal alloys) of which compressor blade 60 is made. For example, where compressor blade 60 primarily includes stainless steel (e.g., grade-316 or another grade), masking system 200, masking system 300, and/or masking system 400 may also be manufactured (such as additively manufactured) using stainless steel. In other examples, one or more components of masking system 200, masking system 300, and masking system 400 may be made using another suitable material or materials, such as metals, metal alloys, plastics, thermoplastics, composite materials, or any other suitable material (e.g., any suitable additively-printable material). In high-temperature coating applications, masking system 200, masking system 300, and masking system 400 may be made using material that can withstand the temperatures encountered during the coating process.

While the disclosure above generally discusses the use of masking system 200, masking system 300, and masking system 400 with reference to coating applications, these masking systems may likewise be used to selectively mask compressor blade 60 in other applications where it is desirable to selectively impact only a portion of compressor blade 60 during a process (e.g., a peening process, a sanding process, a media blasting process, et cetera). Further, while the disclosure above generally discusses masking system 200, masking system 300, and masking system 400 with reference to compressor blade 60, masking systems disclosed herein may likewise be used to selectively mask other components, such as other components of gas turbine engine 1 (e.g., fan blade 40 or a turbine blade), components for use in the automotive industry, components for use in the shipping industry, et cetera. The size, shape, and constitution of the various components of masking system 200, masking system 300, and masking system 400 may be reconfigured as desired in line with a particular application.

In some examples, one or more surfaces of compressor blade 60 may be angled. For example, first end 78 and/or second end 80 (FIGS. 3C-3D) of platform 83 of compressor blade 60 may extend from bottom side 82 of platform 83 at an angle. One or more components of masking system 200, masking system 300, and/or masking system 400 may be correspondingly angled to ensure that only airfoil 62 and top edge 91 of platform 83 of compressor blade 60 are exposed when the compressor blade 60 is retained therein.

Thus, as has been described, each of masking system 200, masking system 300, and masking system 400 may be usable to selectively mask compressor blade 60, and may allow for encapsulation and masking of root portion 72 thereof, notwithstanding projection 92.

As used herein, the terms "first," "second," "third", and "fourth" may be used interchangeably to distinguish one component from another and are not intended to signify location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The singular forms "a," "an," and "the" include plural references unless the context clearly dictates otherwise.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims.

The invention claimed is:

1. A masking system for selectively masking a component, the component having a projection, the masking system comprising:

a first piece having a recessed area, the recessed area configured to house the projection; and a second piece securable to the first piece;

wherein, a first portion of the component is masked and a second portion of the component is exposed when the projection is housed within the recessed area and the first piece is secured to the second piece;

wherein the masking system further includes a removable fastener that passes through at least one first opening in the first piece and at least one second opening in the second piece, the at least one first opening in the first piece and the at least one second opening in the second piece being aligned to each other when the first piece is operatively positioned with respect to the second piece;

whereby when the second piece is aligned with first piece for securement of the component, each of the at least one first opening in the first piece corresponds to each of the at least one second opening in the second piece.

2. The masking system of claim 1, wherein the first piece includes a receiving area for receiving the first portion.

3. The masking system of claim 2, wherein a shape of the receiving area corresponds to a shape of the first portion.

4. The masking system of claim 1, wherein the first piece has a unitary construction and the second piece has a unitary construction.

5. The masking system of claim 1, wherein at least one of the first piece and the second piece is additively manufactured.

6. The masking system of claim 1, wherein the component is a gas turbine engine component.

7. The masking system of claim 6, wherein the component is a blade.

8. The masking system of claim 7, wherein the projection extends from a root of the blade.

9. The masking system of claim 8, wherein the first portion includes the root of the blade.

10. The masking system of claim 1, wherein the at least one first opening in the first piece and the at least one second opening in the second piece is oriented in one of a perpendicular orientation to longitudinal axes of the first piece and the second piece or a parallel orientation to longitudinal axes of the first piece and the second piece.

11. The masking system of claim 10, wherein the removable fastener comprises one of a wire tie and a wing nut.

12. A masking system for selectively masking a blade, the blade having a root and a projection extending from the root, the masking system comprising:

a first piece having a recessed area, the recessed area configured to house the projection; and a second piece securable to the first piece;

wherein, when the projection is housed within the recessed area and the first piece is secured to the second piece, the root is encapsulated by the masking system;

wherein the masking system further includes a removable fastener that passes through at least one first opening in the first piece and at least one second opening in the second piece, the at least one first opening in the first piece and the at least one second opening in the second piece being aligned to each other when the first piece is operatively positioned with respect to the second piece;

whereby when the second piece is aligned with first piece for securement of the blade, each of the at least one first opening in the first piece corresponds to each of the at least one second opening in the second piece.

13. The masking system of claim 12, wherein the first piece has a receiving area that supports a bottom surface of the root when the root is encapsulated by the masking system.

14. The masking system of claim 12, wherein an airfoil and a top edge of a platform of the blade are exposed when the root is encapsulated by the masking system and the first piece is secured to the second piece.

15. The masking system of claim 12, wherein the first piece includes a first portion and a second portion, the first portion extending perpendicularly to the second portion.

16. The masking system of claim 12, wherein the first piece has a unitary construction and the second piece has a unitary construction.

17. The masking system of claim 12, wherein the masking system is reusable to selectively mask a second blade.

18. The masking system of claim 12, wherein the at least one first opening in the first piece and the at least one second opening in the second piece is oriented in one of a perpendicular orientation to longitudinal axes of the first piece and the second piece or a parallel orientation to longitudinal axes of the first piece and the second piece.

19. The masking system of claim 18, wherein the removable fastener comprises one of a wire tie and a wing nut.

* * * * *